(12) United States Patent
Bisbee et al.

(10) Patent No.: US 7,162,635 B2
(45) Date of Patent: Jan. 9, 2007

(54) SYSTEM AND METHOD FOR ELECTRONIC TRANSMISSION, STORAGE, AND RETRIEVAL OF AUTHENTICATED ELECTRONIC ORIGINAL DOCUMENTS

(75) Inventors: Stephen F. Bisbee, Baltimore, MD (US); Jack J. Moskowitz, Ellicott City, MD (US); Keith F. Becker, Baltimore, MD (US); Ellis K. Peterson, Arnold, MD (US)

(73) Assignee: eOriginal, Inc., Baltimore, MD (US)

( * ) Notice: Subject to any disclaimer, the term of this patent is extended or adjusted under 35 U.S.C. 154(b) by 797 days.

(21) Appl. No.: 09/737,325

(22) Filed: Dec. 14, 2000

(65) Prior Publication Data

US 2001/0002485 A1 May 31, 2001

Related U.S. Application Data

(63) Continuation of application No. PCT/US00/032746, filed on Dec. 1, 2000, which is a continuation-in-part of application No. 09/452,928, filed on Dec. 2, 1999, now Pat. No. 6,367,013, which is a continuation-in-part of application No. 09/072,079, filed on May 4, 1998, now Pat. No. 6,237,096, which is a continuation-in-part of application No. 08/528,841, filed on Sep. 15, 1995, now Pat. No. 5,748,738, which is a continuation-in-part of application No. 08/373,944, filed on Jan. 17, 1995, now Pat. No. 5,615,268.

(51) Int. Cl.
*H04L 9/32* (2006.01)
*G06F 12/14* (2006.01)

(52) U.S. Cl. .................... 713/176; 713/189

(58) Field of Classification Search .......... 713/176, 713/189
See application file for complete search history.

(56) References Cited

U.S. PATENT DOCUMENTS 4,200,770 A 4/1980 Hellman et al.
4,405,829 A 9/1983 Rivest et al.
4,625,076 A 11/1986 Okamoto et al.

(Continued)

FOREIGN PATENT DOCUMENTS

EP    0 892 521 A2    1/1999

(Continued)

OTHER PUBLICATIONS

Trademark Electronic Search System, results for "electronic original" "e-original" and "trusted custodial utility," pp. 1-6.*

(Continued)

*Primary Examiner*—Emmanuel L. Moise
*Assistant Examiner*—Michael Pyzocha
(74) *Attorney, Agent, or Firm*—Buchanan Ingersoll & Rooney PC

(57) ABSTRACT

Exemplary embodiments include methods of handling stored electronic original objects that have been created by signing information objects by respective transfer agents, submitting signed information objects to a trusted custodial utility, validating the submitted signed information objects by at least testing the integrity of the contents of each signed information object and the validity of the signature of the respective transfer agent, and applying to each validated information object a date-time stamp and a digital signature and authentication certificate of the trusted custodial utility. One method includes re-validating an electronic original object by verifying the digital signature of the trusted custodial utility applied to the object and applying to the re-validated object a current date-time stamp and a digital signature and current authentication certificate of the trusted custodial utility. Other methods include handling information objects that are transferable records according to specified business rules.

36 Claims, 16 Drawing Sheets

U.S. PATENT DOCUMENTS

| | | | |
|---|---|---|---|
| 4,827,508 A | 5/1989 | Shear | |
| 4,853,961 A | 8/1989 | Pastor | |
| 4,868,877 A * | 9/1989 | Fischer | 713/157 |
| 4,885,777 A * | 12/1989 | Takaragi et al. | 380/30 |
| 4,893,338 A | 1/1990 | Pastor | |
| 4,977,594 A | 12/1990 | Shear | |
| 4,981,370 A | 1/1991 | Dziewit et al. | |
| 4,988,209 A * | 1/1991 | Davidson et al. | 370/270 |
| 4,995,082 A | 2/1991 | Schnorr | |
| 5,001,752 A * | 3/1991 | Fischer | 713/178 |
| 5,003,405 A | 3/1991 | Wulforst | |
| 5,005,200 A | 4/1991 | Fischer | |
| 5,031,214 A | 7/1991 | Dziewit et al. | |
| 5,050,213 A | 9/1991 | Shear | |
| 5,136,646 A | 8/1992 | Haber et al. | |
| 5,136,647 A | 8/1992 | Haber et al. | |
| 5,163,091 A | 11/1992 | Graziano et al. | |
| 5,164,988 A | 11/1992 | Matyas et al. | |
| 5,191,613 A * | 3/1993 | Graziano et al. | 713/176 |
| 5,208,858 A * | 5/1993 | Vollert et al. | 380/43 |
| 5,214,703 A | 5/1993 | Massey et al. | |
| 5,231,668 A | 7/1993 | Kravitz | |
| 5,267,314 A | 11/1993 | Stambler | |
| 5,276,737 A | 1/1994 | Micali | |
| 5,315,658 A | 5/1994 | Micali | |
| 5,323,146 A | 6/1994 | Glaschick | |
| 5,339,361 A | 8/1994 | Schwalm et al. | |
| 5,363,448 A | 11/1994 | Koopman, Jr. et al. | |
| 5,371,794 A | 12/1994 | Diffie et al. | |
| 5,373,561 A | 12/1994 | Haber et al. | |
| 5,377,270 A | 12/1994 | Koopman, Jr. et al. | |
| 5,390,247 A | 2/1995 | Fischer | |
| 5,410,598 A | 4/1995 | Shear | |
| RE34,954 E | 5/1995 | Haber et al. | |
| 5,422,953 A * | 6/1995 | Fischer | 713/172 |
| 5,424,526 A * | 6/1995 | Leonhardt et al. | 235/487 |
| 5,490,217 A * | 2/1996 | Wang et al. | 380/51 |
| 5,524,073 A | 6/1996 | Stambler | |
| 5,534,855 A | 7/1996 | Shockley et al. | |
| 5,555,303 A | 9/1996 | Stambler | |
| 5,555,307 A | 9/1996 | Le Corre et al. | |
| 5,594,863 A * | 1/1997 | Stiles | 714/15 |
| 5,615,268 A | 3/1997 | Bisbee et al. | |
| 5,646,998 A | 7/1997 | Stambler | |
| 5,699,431 A | 12/1997 | Van Oorschot et al. | |
| 5,715,403 A * | 2/1998 | Stefik | 705/44 |
| 5,748,738 A | 5/1998 | Bisbee et al. | |
| 5,781,629 A | 7/1998 | Haber et al. | |
| 5,793,302 A | 8/1998 | Stambler | |
| 5,848,872 A | 12/1998 | Manes et al. | |
| 5,872,848 A | 2/1999 | Romney et al. | |
| 5,892,900 A | 4/1999 | Ginter et al. | |
| 5,910,987 A | 6/1999 | Ginter et al. | |
| 5,915,019 A | 6/1999 | Ginter et al. | |
| 5,917,912 A | 6/1999 | Ginter et al. | |
| 5,920,861 A | 7/1999 | Hall et al. | |
| 5,936,541 A | 8/1999 | Stambler | |
| 5,943,422 A | 8/1999 | Van Wie et al. | |
| 5,949,876 A | 9/1999 | Ginter et al. | |
| 5,974,148 A | 10/1999 | Stambler | |
| 5,982,891 A | 11/1999 | Ginter et al. | |
| 5,987,429 A | 11/1999 | Maritzen et al. | |
| 6,023,509 A | 2/2000 | Herbert et al. | |
| 6,038,035 A | 3/2000 | Wulforst | |
| 6,044,462 A | 3/2000 | Zubeldia et al. | |
| 6,070,239 A | 5/2000 | McManis | |
| 6,085,322 A | 7/2000 | Romney et al. | |
| 6,237,096 B1 | 5/2001 | Bisbee et al. | |
| 6,367,013 B1 | 4/2002 | Bisbee et al. | |
| 2002/0019838 A1 | 2/2002 | Petrogiannis | |
| 2002/0038318 A1 | 3/2002 | Cochran | |
| 2002/0078159 A1 | 6/2002 | Petrogiannis et al. | |
| 2002/0091651 A1 | 7/2002 | Petrogiannis et al. | |
| 2002/0128940 A1 | 9/2002 | Orrin et al. | |

FOREIGN PATENT DOCUMENTS

| | | |
|---|---|---|
| EP | 892 521 | 1/1999 |
| WO | 97 12460 | 4/1997 |
| WO | WO01/41360 | 6/2001 |

OTHER PUBLICATIONS

AuthentiDate.com Launches Inaugural Advertising Campaign—National Print/Online Ads Promote Unique Document Authentication Technology, May 15, 2000, [online], and AuthentiDate.com FAQ [online], [retrieved on Oct. 18, 2000] Retrieved from the Internet: <URL: www.authentidate.com>.

"The Pen and Paper Free Solution to On-Line Mortgages", IsignOnline, Inc., [online] [retrieved on Nov. 11, 1999] Retrieved from the Internet: <http://isignonline.com>.

Bulkeley, W.M., "Patent Application Could Evolve into Trouble for e-Commerce", WallStreet Journal, [online], [retrieved on Aug. 29, 2000] Retrieved from the Internet: <URL: http://msnbc.com/new/451936.asp?cp1=1>.

CCITT Draft Recommendation X.411, Ver. 4e, .sctnS . 8.3.1.1.2.2 and 8.3.1.1.2.3 (Jun. 1987).

Chaum, D., "Achieving Electronic Privacy", Scientific American, pp. 96-101, Aug. 1992.

DE Technologies, L.L.C., homepage, company overview, services [online], [retrieved on Oct. 18, 2000] Retrieved from the Internet: <URL: www.detechnologies.com>.

Dekleermaeker, L., "The Validity of Electronic Communication", Klewer Dedrijfswetenschappen, Netherlands, vol. 38, pp. 38-41, Apr. 1996.

Diffie, W., "Privacy and Authentication: An Introduction to Cryptography", Proceeding of the IEEE, vol. 67, No. 3, Mar. 1979.

Diffie, W., "The First Ten Years of Public-Key Cryptography", IEEE, vol. 76, No. 5, pp. 560-577, May 1988.

Ford, Warwick and Michael S. Baum, Secure Electronic Commerce, 1997, 204-205, 248-249, and 293-294.

Froomkin, A. Michael, "The Essential Role of Trusted Third parties in Electronic Commerce", Version 1.02, Oct. 14, 1996.

Hellman, M., "The Mathematics of Public-key Cryptography", Aug. 1979.

Hice, G.F., et al., "DMS Prologue to the Government E-mail Revolution, A Review of the Defense Message System" J.G. Van Kyke and Associates, Inc., pp. 47-70, 1995.

Higgins, D., et al., "Surge in US patents Could Blunt the Edge of Dot Com Innovators", Biz.com [online], [retrieved on Oct. 16, 2000] Retrieved from the Internet: <URL: http://www.smh.com.au/news/0008/29/bizcom/bizcom2.html>.

Illumin Corp. Technology, Partners, Solutions [online], [retrieved on Oct. 3, 2000] Retrieved from the Internet: <URL: www.ilumin.com>.

Ingram, P., "Message Handling Systems: Message Transfer System: Abstract Service Definition and Procedures", Version 4, Geneva, pp. 51-56, Jun. 1987.

Kent, S., et al., "Privacy Enhancement for Internet Electronic Mail: Part II Certificate Based Key Management", Obsoleted by RFC1422 Archive, IAB Privacy Task Force, Aug. 1989.

Menezes, Alfred J., Paul C. van Oorschot, and Scott A. Vanstone, Handbook of Applied Cryptography, 1996, pp. 580.

Merrill, C., "Cryptography for Commerce-Beyond Clipper", The Data Law Report, vol. 2, No. 2, Sep. 19, 1994.

Nadile, L., "Service Notarizes Electronic Documents", PC Week, Jan. 16, 1995.

Network World, "Start-up Fileds Time-stamp System. Company Unveils First Electronic File Validation Software." Jan. 30, 1995, p. 13.

O'Mahony, D. , "Electronic Payment Systems", 1997.

Rivest, R.L., "A Method for Obtaining Digital Signatures and Public-Key Cryptosystems", Communications from the ACM, vol. 21, No. 2, Feb. 1978.

Schneier, B., "Protocols, Algorithms, and Source Code in C", Applied Cryptography, Second Edition, pp. (185-187)(574-577), 1996.

Schwartau, W., "Safe Passage Digital Receipts ensure that a Transaction Completed is a Transaction Confirmed", Network World-The Electronic Commerce Issue, Feb. 28, 2000.

Shannon, C.E., "Communication Theory of Secrecy Systems", Bell System Technical Journal, p. 379, Jul. 1948.

Slind-Flor, V., "Ticket to Riches—or to Court", The National Law Journal [online], [retrieved on Oct. 2, 2000] Retrieved from the Internet: <URL: http://www.law.com/cgi-bin/gx.cgi/AppLogic+FTContentServer?pagename+law/View&c=A . . . >.

Herda, S., "Non-Repudiation: Constituting Evidence an Proof in Digital Cooperation", Computer Standards and Interfaces, Elsevier Sequoia, Lausanne, vol. 17, No. 1, pp. 69-79, Jan. 1995.

Lowry, J., "Location-Independent Information Object Security", Proceedings of the Symposium on Network and Distributed System Security, pp. 54-61, Feb. 17, 1995.

* cited by examiner

Original Deal

[TN#212, OI#2-01
30 Mortgage @ 7 %
Property Description
Lender, Borrower

| TN#212-01 | TCU-DS01 |
| TN#212-02 | TCU-DS02 |
| TN#212-03 | TCU-DS03 |
| TN#212-04 | TCU-DS04 |

11/02/1997 10:20PM]OI02

Adding eOriginals

[TN#212, OI#2-02
30 Mortgage @ 7 %
Property Description
Lender, Borrower

| OI#2-01 | TCU-OI01 |
| TN#212-01 | TCU-DS01 |
| TN#212-02 | TCU-DS02 |
| TN#212-03 | TCU-DS03 |
| TN#212-04 | TCU-DS04 |
| TN#212-05 | TCU-DS05 |
| TN#212-06 | TCU-DS06 |

11/06/1997 11:00PM]OI03

Adding new eOriginals

SYSTEM AND METHOD FOR ELECTRONIC TRANSMISSION, STORAGE, AND RETRIEVAL OF AUTHENTICATED ELECTRONIC ORIGINAL DOCUMENTS

This application is a continuation of International Application No. PCT/US00/032746, filed on Dec. 1, 2000, which designates the United States, which is a continuation-in-part of U.S. patent application Ser. No. 09/452,928, filed on Dec. 2, 1999 now U.S. Pat. No. 6,367,013, which is a continuation-in-part of U.S. patent application Ser. No. 09/072,079 filed on May 4, 1998 now U.S. Pat. No. 6,237,096, which is a continuation-in-part of U.S. patent application Ser. No. 08/528,841 filed Sep. 15, 1995, now U.S. Pat. No. 5,748,738, which is a continuation-in-part of U.S. patent application Ser. No. 08/373,944 filed Jan. 17, 1995, now U.S. Pat. No. 5,615,268, all by Bisbee et al.

BACKGROUND

These inventions relate to systems and methods for providing a verifiable chain of evidence and security for the transfer and retrieval of documents and other information objects in digital formats.

The continuing evolution of the methods of commerce is evident in the increasing replacement of paper-based communications with electronic communications. When communication is by electronically reproduced messages such as e-mail, facsimile machine, imaging, electronic data interchange or electronic fund transfer, however, there no longer exists a signature or seal to authenticate the identity of a party to a deal or transaction. The traditional legally accepted methods of verifying the identity of a document's originator, such as physical presence or appearance, a blue-ink signature, personal witness or Notary Public acknowledgment, are not possible.

To address these problems, a document authentication system (DAS) has been described that provides the needed security and protection of electronic information objects, or electronic documents and other information objects, and that advantageously utilizes an asymmetric cryptographic system to help ensure that a party originating an information object is electronically identifiable as such. This system is one aspect of the methods and apparatus for secure transmission, storage, and retrieval of information objects that are described in U.S. Pat. Nos. 5,615,268 and 5,748,738, both to Bisbee et al., and in U.S. patent application Ser. No. 09/072,079 filed on May 4, 1998, and Ser. No. 09/452,928 filed on Dec. 2, 1999, both by Bisbee at al. These patents and applications are expressly incorporated by reference in this application.

As an initial matter, it will be helpful to understand the following terminology that is common in the field of secure electronic commerce and communications.

"Public key cryptography (PKC)" uses pairs of cryptographic "keys", each pair having a private (secret) key and a public key, that are associated with respective registered users. The public keys are published for anyone to use for encrypting information intended for the respective users. Only the holder of the paired private key can read information, i.e., an electronic document or more generally an information object, that was encrypted using the respective public key. Conversely, an electronic document that is "digitally signed" using a user's private key can be verified as that user's by anyone who knows the user's public key. The encrypt and decrypt functions of both keys are truly "one-way", meaning that no one can determine a private key from the corresponding public key, and vice versa, which in popular PKC systems is due to the fact that, at least currently, finding large prime numbers is computationally easy but factoring the products of two large prime numbers is computationally difficult. Example PKC algorithms, which comply with applicable government or commercial standards, are the digital signature algorithm (DSA/RSA) and secure hash algorithm (SHA-1/MD5).

Various aspects of public-key cryptographic (PKC) systems are described in the literature, including R. L. Rivest et al., "A Method for Obtaining Digital Signatures and Public-Key Cryptosystems," *Communications of the ACM* vol. 21, pp. 120–126 (February 1978); M. E. Hellman, "The Mathematics of Public-Key Cryptography", *Scientific American*, vol. 234, no. 8, pp. 146–152, 154–157 (August 1979); and W. Diffie, "The First Ten Years of Public-Key Cryptography", *Proceedings of the IEEE*, vol. 76, pp. 560–577 (May 1988). It can also be noted that for a PKC system, as for other cryptographic systems, the system's strength, i.e., the computational effort needed to break an encrypted message, depends to a great extent on the length of the key, as described in C. E. Shannon, "Communication Theory of Secrecy Systems", *Bell Sys. Tech. J.* vol. 28, pp. 656–715 (October 1949).

A "holographic signature" means a handwritten signature. A "digitized holographic signature" means a handwritten signature that has been captured electronically, e.g., by using a stylus pad or scanner to create a bit image of the holographic signature.

A "digital signature" is an unforgeable data element, which asserts that the user(s) corresponding to the digital signature wrote or otherwise agreed to the contents of an electronic document or other information object to which the digital signature is appended. A digital signature is typically created by "hashing" the electronic document, encrypting the resulting hash (integrity block) using the user's private (secret) key, and appending the encrypted hash to the electronic document.

An "authentication certificate" is an unforgeable digitally signed data element that binds a user's public key to the user's identity information and that advantageously, but not necessarily, conforms to the international standard X.509 version 3, "The Directory-Authentication Framework 1988", promulgated by the International Telecommunications Union (ITU). Each authentication certificate includes the following critical information needed in the signing and verification processes: a version number, a serial number, an identification of the Certification Authority (CA) that issued the certificate, identifications of the issuer's hash and digital signature algorithms, a validity period, a unique identification of the user who owns the certificate, and the user's public cryptographic signature verification key. Authentication certificates are issued and digitally signed by a CA that is responsible for insuring the unique identification of all users.

An authentication certificate is a digital "ID", much like a driver's license or other documentation that is used to verify a person's identity. The e-original public key infrastructure can use the X.509v3 certificate that is based on an ISO/ITU standard, as interpreted by the Internet Engineering Task Force (IETF) Public Key Infrastructure X.509 (PKIX) recommendations. These certificates are digitally signed by the issuing Certification Authority, which ensures both content and source integrity. The act of digitally signing makes the certificates substantially tamper-proof, and therefore further protection is not needed. The intent of the certificate is to reliably associate (bind) a user's name to the user's public cryptographic key. The strength of protection equates directly to the strength of the algorithm and key size used in creating the issuer's digital signature (hash and digital signature algorithms). A certificate therefore securely identifies the owner of the public key pair, which is used to provide authentication, authorization, encryption, and non-repudiation services. A typical certificate has the following form:

[Version, Serial No., Issuer Algorithm (Hash & Digital Signature), Issuer Distinguished Name (DN), Validity Period, Subject DN, Subject Public Key Info, Issuer Unique Identifier (optional), Subject Unique Identifier (optional), Issuer Public Key, Extensions (e.g., Subject Alt Name)]Issuer Digital Signature A unique DN is formed by concatenating naming specific information (e.g., country, locality, organization, organization unit, e-mail address, common name).

Certificate extensions can also be used as a way of associating additional attributes with users or public keys, and for managing the public key infrastructure certificate hierarchy. Guidance for using extensions is available in the recommendations of ITU X.509v3 (1993)|ISO/IEC 9594-8: 1995, "The Directory: Authentication Framework" or in IETF Internet X.509 Public Key Infrastructure Certificate and CRL Profile<draft-ietf-pkix-ipki-part1-11>.

A user's authentication certificate is advantageously and preferably appended to an electronic document with the user's digital signature so that it is possible to verify the digital signature. Alternatively, the certificate may be retrieved from the issuing CA or directory archive.

"Public Key Infrastructure (PKI)" is the hierarchy of CAs responsible for issuing authentication certificates and certified cryptographic keys used for digitally signing and encrypting information objects. Certificates and certification frameworks are described in C. R. Merrill, "Cryptography for Commerce—Beyond Clipper", *The Data Law Report*, vol. 2, no. 2, pp. 1, 4–11 (September 1994) and in the X.509 specification, which are expressly incorporated by reference in this application.

As described in the cited patents and application, an electronic original object having the same legal weight as a blue-ink-signed paper document (e.g., a negotiable instrument) is made possible by contract and by the PKI and associated technology. An electronic document, or more generally an information object, is created, and the information object is executed by appending one or more digital signatures and authentication certificates. Control of the resulting digitally signed information object is then transferred to a Trusted Custodial Utility (TCU) that is a trusted third-party repository of information objects and that is specifically designed and empowered by contract to store reliably any such object for its full effective life. The contractual aspect is an agreement between the TCU and the party submitting or relying on a digitally signed object to be bound by their digital signatures and to accept reliance on the TCU as custodian of the information objects.

The TCU implements defined business rules for the transactions handled by the TCU (i.e., a complete set of authorized actions). The TCU also implements a defined security policy (i.e., a set of protective measures that is necessary to prevent unauthorized actions). The TCU uses its business rules and security policy to govern transaction requests and access to the repository over the respective life cycles of all documents and objects within its control, verifying the identities and authorities of parties (local and remote) requesting repository services. The TCU securely stores and securely retrieves digitally signed, authenticated, and encrypted electronic documents or information objects. Upon request, the TCU prints and issues certified documents. The TCU advantageously supports a multi-port token server for proving document authenticity, for verifying the identities of signing parties, and for authenticating document submissions. The TCU provides for backup and disaster recovery, and ensures that stored information is not lost within a specified retention period, whether that period is specified by a user, law, or regulation.

A "wrapper" is used to securely hold and associate digitized handwritten and cryptographic digital signatures with part or all of one or more electronic information objects contained therein. Wrappers may take the form of any open standard enveloping or information object (document) formatting schemas. Two examples are the RSA Public Key Cryptographic Standard (PKCS) #7 and the World Wide Web Consortium (W3C) Extensible Markup Language (XML) Signature Syntax and Processing Draft Recommendation. The RSA PKCS #7 standard supports zero, one, and multiple parallel and serial digital signatures (cosign and countersign). PCKS #7 supports authenticated and unauthenticated attributes that are associated with the "signature block". The signer's digital signature is usually computed over the hash of the information object and authenticated data. An unauthenticated attribute is not protected. Some other formats that provide support for signature syntax, processing and positioning (tags) are S/MIME, HTML, XHTML, and XFDL. Any of these wrapper formats can be applied recursively and markup languages extended to provide signature and protection layering.

A "signature block" includes at least two components: signer information and certificate information. Signer information contains the hash of the information object(s) (content) with an authenticate attribute, digital signature, and unauthenticated attribute appended. A hash is computed over both information object(s) hash and authenticated attribute fields and encrypted using the signer's private key thereby creating a digital signature. The authenticated attribute field contains pertinent additional information relating to the act of signing and is protected by the signer's digital signature. The unauthenticated attribute can be used to convey additional information to the TCU and/or by the TCU to document when the signature arrived at the TCU. Certificate information contains the signer's X.509 certificate. It may also contain some form of attribute certificate signed by a TCU recognized issuing authority. This attribute certificate is used to convey additional qualifying information about the signer that may aid the TCU in making access control decisions.

With all of the advantages of electronic original information objects that are provided by the U.S. patents and application incorporated by reference above, it is important to realize that a digital signature is not valid indefinitely but only during the validity period of its authentication certificate. The validity period of an authentication certificate is also not indefinite but typically is set so as to limit the chances for compromise of the digital signature, e.g., as a result of theft of the secret signature key or decreased cryptographic viability. Validity periods can be in the range of one year to three years, although other periods are also possible. A TCU's authentication certificate's validity period is normally longer than the validity period of a user's certificate, and the cryptographic strength of a TCU's certificate is normally stronger than that of a user's certificate. For these reasons and because of the TCU's verification of content integrity and of digital signature(s) and certificate(s) validity on receipt of an information object, the validity period of the TCU's digital signature as conveyed in the TCU's certificate may supersede, or extend, the validity period(s) of the received information object's digital signature(s), provided the TCU physically protects the received object's contents from external tampering.

Such extension is not unlimited, however, because the validity period of a TCU's signature is itself limited. This poses a problem for information objects that are intended to have legal weight for periods longer than the remaining validity period of a TCU's signature.

In addition, the process of generating e-original objects can provide the evidence necessary to establish the transfer of interests in a "transferable record" since it reliably establishes a document's issuer/owner as the person to which the transferable record was issued or transferred. A "transferable record" means an information object, an interest in which the owner/issuer has expressly agreed is transferable. In particular, a single authoritative copy of the transferable record exists which is unique, identifiable, and unalterable, except that copies or revisions that add or change an identified assignee of the authoritative copy can be made only with the consent of the person asserting control and that each copy of the authoritative copy and any copy of a copy is readily identifiable as a copy that is not the authoritative copy. Also, the authoritative copy identifies the person asserting control as the person to which the transferable record was issued, or if the authoritative copy indicates that the transferable record has been transferred, the person to which the transferable record was most recently transferred. Also, the authoritative copy is communicated to and maintained by the person asserting control or its designated custodian, and any revision of the authoritative copy is readily identifiable as authorized or unauthorized.

In general, however, an e-original may be, but is not required to be, a transferable record. In other words, not all e-originals are transferable records, but transferable records are e-originals. This can be important to information objects such as agreements that may be executed in any number of "counterparts", each of which should be an e-original with the same effect as if the signatures on the various counterparts were upon one document. A "counterpart" of an agreement or information object is one of possibly many e-originals that are replicas of an agreement or object that may be executed separately, with each counterpart being an original with the same effect as if the signatures on the counterparts were upon the same original.

Agreements may also be executed collaboratively by incorporating multiple signatures within the same document. Collaborative execution may take place non-sequentially at one or more locations. The process of applying multiparty or multiple signatures refers to execution of an agreement where multiple digital signatures are applied either at one time, sequentially, or in parallel.

With all of the advantages of e-original information objects that are provided by the U.S. patents and applications incorporated by reference above, it is important to realize that where transferable records are concerned, copies of an information object that exist outside of the control of a TCU must not be able to be mistaken for an e-original, i.e., the transferable record itself. An e-original may be effective as a blue-ink-signed paper document since one or more digital signatures are applied during execution of an electronic document and control of the resulting digitally signed electronic document is transferred to a TCU, which is a trusted repository of e-original objects that reliably and securely stores e-originals for their full effective lives. On receipt of a digitally signed electronic document, a TCU verifies the authenticity of the electronic document, i.e., verify the integrity of the document's contents, the validity of all digital signatures and associated authentication certificates (e.g., ITU X.509v3 certificates), and the authority of the document's submitter. A successful authenticity verification attests to the legitimacy of the submitted electronic document. The TCU then creates the e-original by appending a date-time stamp and its digital signature and certificate (signature block). This TCU action demonstrates the TCU's assumption of control of the e-original.

SUMMARY

Applicants' inventions solve this and other problems suffered by prior approaches to authentication of information objects.

In one aspect of Applicants' inventions, there is provided a method of handling stored e-original objects that have been created by signing information objects by respective Transfer Agents, submitting signed information objects to a TCU, validating the submitted signed information objects by at least testing the integrity of the contents of each signed information object and the validity of the signature of the respective Transfer Agent, and applying to each validated information object a date-time stamp and a digital signature and authentication certificate of the TCU. The method includes the steps selecting a stored e-original object; re-validating the selected e-original object by at least verifying the digital signature of the TCU applied to the selected e-original object; and applying to the re-validated e-original object a current date-time stamp and a digital signature and current authentication certificate of the TCU.

The method's applying step may be performed before the expiration of the validity period of the current authentication certificate of the TCU applied to the selected e-original object. In this way, the validity period of the re-validated e-original object is extended to the current authentication certificate's validity period. Also, a Transfer Agent may sign an information object by appending a verifiable digitized signature and a content integrity block to the information object.

Also, the method may be carried out in response to at least one instruction received and validated by the TCU, which validates a received instruction by at least testing an integrity of contents of the received instruction and a validity of a signature of a Transfer Agent on the received instruction, and applies to a validated received instruction a date-time stamp and a digital signature and current authentication certificate. The received instruction may be issued by an authorized entity, and the TCU may validate the received instruction by also checking the authorized entity's authority to issue the received instruction. Ownership of or a right to the re-validated e-original object may be transferred in the TCU based on a validated received instruction. Access to the re-validated e-original object may be granted or controlled in the TCU based on a validated received instruction.

The method may further include the steps of exporting to a second TCU the re-validated e-original object and applied date-time stamp, digital signature, and authentication certificate of the TCU; re-validating, in the second TCU, the exported e-original object by at least verifying the digital signature of the TCU applied to the exported e-original object; and applying to the re-validated exported e-original object a current date-time stamp and a digital signature and current authentication certificate of the second TCU.

In another aspect of Applicants' inventions, there is provided a method of handling stored e-original objects that have been created by signing information objects by respective Transfer Agents, submitting signed information objects to a TCU, validating the submitted signed information objects by at least testing the integrity of the contents of each signed information object and the validity of the signature of the respective Transfer Agent, and applying to each validated information object a date-time stamp and a digital signature and authentication certificate of the TCU. The method includes the steps of creating an object-inventory from at least one stored e-original object, with the object-inventory including at least an object identifier and a signature block for each e-original object from which the object-inventory is created; applying a date-time stamp and a digital signature and authentication certificate of the TCU to the object-inventory; and storing the object-inventory having the applied date-time stamp, digital signature, and authentication certificate. A Transfer Agent may sign an information object by appending a verifiable digitized signature and a content integrity block to the information object.

The method may further include the steps of retrieving a copy of the object-inventory; signing the retrieved copy; submitting the signed copy to the TCU; verifying the signature on the submitted copy; and applying to the copy a current date-time stamp and a digital signature and current authentication certificate of the TCU. In this way, the TCU's control of the e-original objects corresponding to the copy can be affirmed. In addition, an object identifier and a signature block for the object-inventory from which the copy was created can be added to the copy before the current date-time stamp, digital signature, and certificate are applied. These steps can be performed on the copy of the object-inventory before expiration of a validity period of the authentication certificate of the TCU applied to the object-inventory from which the copy was created. In this way, a respective validity period of the object-inventory and of each e-original object from which the object-inventory was created is extended to the current authentication certificate's validity period.

The method may be carried out in response to at least one instruction, and the TCU validates the instruction by at least testing an integrity of contents of the instruction and a validity of a signature of a Transfer Agent on the instruction, and applies to a validated instruction a date-time stamp and a digital signature and current authentication certificate; and at least one of the validated instruction and a reference to the validated instruction is added to the copy. The instruction may be issued by an authorized entity, and the TCU validates the instruction by also checking the authorized entity's authority to issue the instruction.

The TCU may respond to a validated instruction by exporting to a second TCU copies of the new object-inventory and the e-original objects corresponding to the new object-inventory, and the second TCU may perform the steps of re-validating the exported e-original objects corresponding to the exported copy of the new object-inventory by at least verifying the digital signature of the TCU applied to the exported e-original objects; and then applying to the exported copy of the new object-inventory a current date-time stamp and a digital signature and current authentication certificate of the second TCU. An authorized entity may then retrieve, from the second TCU, a copy of the exported copy of the new object-inventory; sign the retrieved copy; and submit the signed retrieved copy to the second TCU; and the second TCU may then apply to the submitted signed retrieved copy a current date-time stamp and its digital signature and current authentication certificate. In this way, transfer of custody and control to the second custodial utility of the e-original objects corresponding to the new object-inventory is affirmed and a respective validity period of each e-original object corresponding to the new object-inventory is extended to the validity period of the current authentication certificate applied by the second custodial utility.

Ownership of e-original objects corresponding to the copy may be transferred in the TCU based on the validated instruction, or at least one right to e-original objects corresponding to the copy may be transferred in the TCU based on the validated instruction. The right may be a right to revenue represented by the e-original objects. Access to at least one e-original object corresponding to the copy may be granted in the TCU to a member of a syndicate based on the validated instruction, or access to at least one e-original object corresponding to the copy may be controlled in the TCU based on the validated instruction.

In another aspect of Applicants' inventions, there is provided a method of handling stored e-original objects in which the TCU handles at least one e-original object based on rules established by an owner of the object. The method includes the the steps of establishing a rule that establishes at least one type of e-original object; establishing a rule that establishes at least one type of e-original object as potential transferable records; establishing a rule that enables at least one selected user to access at least one selected type of e-original object; establishing a rule that identifies at least one type of e-original object required to conclude a deal; and establishing a rule that controls transformation of a selected e-original object into a transferable record.

Based on rules established by an owner of an e-original object requiring execution as part of concluding the deal, the TCU notifies at least one participant in the deal when the e-original object is received by the TCU. The method may further include the step of creating an object-inventory from at least one stored e-original object that is a transferable record and is required to conclude the deal. The object-inventory includes a date-time stamp and a digital signature and authentication certificate of the TCU, and the object-inventory includes a wrapper that includes object identifiers that respectively point to the transferable record and at least one signature block of at least one participant in the deal. The participant's signature block includes a hash of a combination of a master copy of the transferable record and the participant's digitized signature. The object-inventory may further include metadata summarizing the deal.

In another aspect, a method of handling stored e-original objects includes the steps by the TCU of receiving a request submitted by a user for retrieval of an e-original object identified in the request; determining whether the user has authority to submit the request; and if the user is determined to have authority, carrying out the steps of: retrieving the e-original object identified in the request; extracting from the retrieved e-original object content information and at least one signature block; extracting from the signature block signer information; extracting at least one of a date-time of a digitized signature included in the signer information and a date-time of the TCU's receipt of the signature block; extracting from the signature block certificate information that includes signer identifying information; forming a data structure from the extracted information such that upon rendering the content the information is properly placed with respect to the content and includes at least one forgery-resistant indicium that clearly identifies the rendered information as a copy; and communicating the data structure to the user.

In yet another aspect, a method of handling stored e-original objects based on rules established by an owner of at least one e-original object includes the steps of authenticating an identity of the owner; establishing rules relating to a deal, wherein the rules include a rule that establishes at least one type of e-original object, a rule that establishes at least one type of e-original object as potential transferable records, a rule that enables at least one selected user to access at least one selected type of e-original object, a rule that identifies at least one type of e-original object required to conclude a deal, a rule that controls transformation of a selected e-original object into a transferable record, a rule that identifies at least one user able to authorize transfer of an interest in a transferable record; and validating the owner's right to act with respect to the deal.

BRIEF DESCRIPTION OF THE DRAWINGS

The features, objects, and advantages of Applicants' inventions can be understood by reading this description in conjunction with the drawings in which.

DETAILED DESCRIPTION

Applicants' inventions can be implemented utilizing commercially available computer systems and technology to create an integrated closed system for authentication of electronic documents and other information objects.

Figure 1:
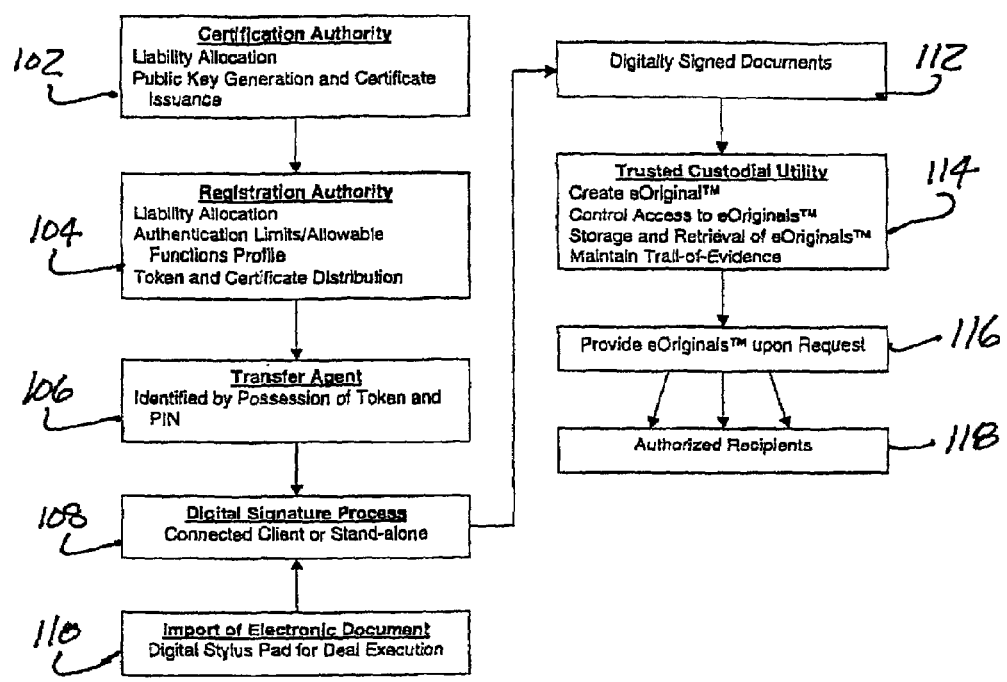
FIG. 1 is a block diagram of liability allocation in a document authentication system that creates electronic original objects.

FIG. 1 is a block diagram of the liability allocation for authentication in Applicants' DAS, which uses a CA framework by which public/private keys used to encrypt/decrypt and/or digitally sign objects are delivered to a object's originator by an established, auditable means. The infrastructure and certificate definitions used in this application are based on the X.509 standard and the publication by C. R. Merrill cited and incorporated above.

As described below, the public/private key is advantageously delivered in the form of a Token such as an electronic circuit card conforming to the standards of the PC Memory Card Interface Association (a PCMCIA card or PC Card) for use in the originator's computer. In general a Token is a portable transfer device that is used for transporting keys, or parts of keys. It will be understood that PC Cards are just one form of delivery mechanism for public/private keys; other kinds of Tokens may also be used, such as floppy diskettes, Smart Cards, universal serial bus (USB) tokens, integrated circuits, etc. Advantageously, many commercially available Tokens that embody on-board cryptography generate the public/private key pairs on the cards, and the private keys never leave the cards unencrypted. Using an integrated circuit, such as a memory device or a programmable processor with memory, for a Token has the advantage of small size, enabling Tokens to be included in many communication and computing devices, like cellular telephones, personal digital assistants, handheld computers, identification badges, etc.

The public keys are generated and issued by or under the control of the Certification Authority (block 102), with a certificate including the identity of the intended recipient and appropriate user attributes, among other things. Principal components of the DAS assurance are the correct operation of the Certification Authority framework, the tight binding of user identity and attributes to the public key in the authentication certificate, and the reliable delivery of the Token to the authorized recipient.

As illustrated in FIG. 1, it can be convenient from a management point of view to use a Registration Authority (block 104) as an intermediary between the CA and a Transfer Agent (block 106). This permits the CA to concentrate on controlling generation of cryptographic keys and issuing certificates. The Registration Authority (RA) can then concentrate on other management aspects of the DAS, such as performing Transfer Agent enrollment, recording and associating attributes of the Transfer Agent with the Agent's public key, setting a Token activation personal identification number (PIN), and certificate ordering and retrieval. For example, the Transfer Agent may be authorized to conduct only certain types of deals or transactions and/or deals or transactions having less than a predetermined value. To ensure reliable delivery, the RA may use a service such as the bonded courier services commonly used to ferry securities between parties to deliver the Token to the object originator. Positioning the RA locally has several advantages, including for example face-to-face proof of identity and direct delivery of the Token.

In an additional aspect of the DAS, the public/private key is effective only when it is used in conjunction with a certificate and personal identification information such as the recipient's biometric information (e.g., retina-, finger-, and voice-prints) or a PIN that is assigned to the recipient of the Token by the CA or RA and that may be delivered by the RA separate from the originator's Token. Any subsequent transmitter of an electronic object who is required to digitally sign or encrypt the object would similarly be provided with a respective Token and personal identification information. It will be appreciated that a Token's user advantageously may be permitted to change an assigned PIN to one of the user's own choosing and that the PIN may be any suitable password or passphrase. This improves security since the PIN is then only known by that user.

In FIG. 1, an information object's originator and any subsequent transmitter are called a Transfer Agent, and it will be appreciated that a Transfer Agent is identified to the DAS by its possession and use of a valid certificate and a valid PIN. As noted above, the authentication certificate also indicates one or more attributes of the Transfer Agent.

Issuance by the CA of a digitally signed certificate ensures the verifiability of the identity of each transmitter of a digitally signed or encrypted object. The CA also retains the ability to revoke a certificate and public/private key, or to reissue a certificate and public/private key, from a remote location electronically. The CA can also support privilege management in accordance with the policy set for the system. For example, the CA and/or RA can set financial or other limits on the authority granted to the Transfer Agent by conveying those authorizations or restrictions as certificate attributes. These attributes can be retrieved from the certificate and enforced by other elements in the system.

As depicted by blocks 108, 110, the Transfer Agent arranges for the information object in digital form, such as the output of a conventional word processor, to be imported into a device incorporating the Transfer Agent's Token. The Token may be incorporated in a client workstation connected to a DAS or subscriber's network or the Internet, or in a stand-alone workstation that advantageously can distinguish among a plurality of unrelated deals or transactions by, for example, a log-in password. As noted above, the Token may be an integrated circuit that is included in a handheld computer, cellular telephone, or the like that may be connected to a network by an infrared or radio link. As an option, a device for digitizing hand-written signatures of participants in a deal or transaction may also be provided and the digitized signatures may be added to the electronic object. In addition, the participants in a deal or transaction may append their own digital signatures and authentication certificates to the electronic object.

The information object is digitally signed and/or encrypted and the authentication certificate is appended by the DAS, thereby attesting to the fact that the Transfer Agent witnessed the participants sign the electronic document. The digitally signed and/or encrypted document may be electronically communicated to the TCU via a modem or computer network (block 112). Other ways of communicating digitally signed or encrypted documents might be used (for example, dispatching a diskette containing the document), but the great advantage of electronic communication is speed.

In addition, although it is currently believed to be preferable for the Transfer Agent to digitally sign an information object before submitting the result to a TCU, it is only necessary for the Transfer Agent to "sign" an information object in a way that can be understood, legally or otherwise, as the Transfer Agent's attesting to the integrity and validity of the information object. For example, the Transfer Agent might append to an information object a digitized hand-written signature, a digitized signature and verifiable biometric information, a digital signature, or a combination of these. Alternatively, the Transfer Agent can sign an information object by connecting to a TCU using the password and other procedures of a secure protocol, such as the secure sockets layer (SSL) security protocol for the TCP/IP (Internet) communication protocol. As should be clear from this description, it is important for the DAS to assure itself that a Transfer Agent is who the Agent purports to be. If not already provided in the course of signing an object, the Transfer Agent appends a hash, a cyclic redundancy check (CRC) information element, or other type of content integrity block to the object, thereby ensuring the integrity, i.e., unchangeability, of the information object.

Before submission to the TCU, the signed information object may preferably be formatted such that it includes suitable instructions for parsing and processing its contents. A convenient form of wrapper (e.g., PEM, RSA PKCS#7, or S/MIME) or markup language (e.g., HTML, XML, or XFDL) can be used for this purpose. The contents can be one or more information objects (each comprising one or more electronic documents, images, computer source code, computer executable code, databases, data compilations, etc.), date-time stamps, digital signatures and matching certificates, and/or indicators, which include, but are not limited to, content types, object identifiers, and encoding rules and tags. If the TCU accepts submissions created with different encryption, hashing, or digital signature algorithms or algorithm suites, as may be expected in order for the system to keep pace with changing techniques, then the indicator(s) must identify the algorithm(s) and key size. It will be understood that if the TCU accepts submissions created with only one or a small enough number of algorithms, such formatting is not needed since the TCU could simply test objects with each permitted algorithm. Also, if a non-verifiable Transfer Agent signature is used, the Transfer Agent should be authenticated in another way, such as by communication session authentication, which can be achieved by requiring a combination of a user (Transfer Agent) identifier and a password or by a client authenticated secure sockets layer (SSL) protocol.

The TCU validates the Transfer Agent's identity and rights and verifies the integrity of submitted information objects. Use of digital signatures directly supports validation of both Transfer Agent identity and information object content integrity. Once it is determined that an information object has not been altered prior to or during submission and that the object's Transfer Agent has the proper authorizations, the TCU assumes custody and control of the object and responsibility for the object's preservation by appending a date-time stamp and digitally signing the submission.

On receiving a digitally signed electronic object (block 114), the TCU tests the integrity of the electronic object's contents, the validity period of the Transfer Agent's certificate, and the status (valid or revoked) of the authentication certificate (e.g., ITU X.509v3 certificate(s)). The test of the integrity of the object contents, which may also be called "digital signature verification", comprises extracting the public key from the authentication certificate, decrypting the digital signature (thereby uncovering the object's hash), computing a new object hash, and checking the uncovered hash against the new hash. The test of the validity period comprises simply ensuring that the current date and time falls within the validity period noted in the certificate. The test of the validity of the certificate comprises querying the PKI to determine whether the certificate was not revoked or otherwise restricted at the time of digital signing. These three tests together may be called a "validation" process. Successful tests signify the authenticity of the received digitally signed electronic object, that is to say, who submitted the electronic object and that the object's contents have not changed during the submission process.

Besides testing the validity of the digital signature(s) of the Transfer Agent(s), the TCU may also test the validity of the digital signature(s) of the participant(s) in a deal or transaction. This has the possible disadvantage of increased computational effort but the advantage of increased resistance to repudiation: validating the digital signature(s) of the participant(s) ensures that the intended party or parties actually signed the electronic document. Where a digitized hand-written signature of a participant or Transfer Agent is captured, validation may also be possible by including verifiable biometric information with the signature (e.g., the speed and/or pressure of the signer's pen strokes). It will be appreciated that if the Transfer Agent merely signs an object, rather than digitally signing it, as noted above, then the validation process is appropriately adapted, e.g., by replacing the tests described above with a test of the hash, CRC, or other content integrity block appended to the submitted object to confirm that the object's contents have not changed during the submission process and with a verification of the "signature" of the Transfer Agent.

The TCU transforms an authenticated received digitally signed electronic object into an electronic original object by appending a date-time stamp and the TCU's digital signature and authentication certificate to the authenticated received digitally signed electronic object. The date-time stamp can take any convenient form and is analogous to the simple rubber stamp available in many mail rooms. The digital signature applied by the TCU eliminates the possibility of unauthorized alteration or tampering with an object by the signatories subsequent to its original execution or sealing. In addition, the TCU's digital signature can advantageously provide for non-repudiation, i.e., precluding the originator from disavowing the object. This action by the TCU marks the TCU's assumption of custody and control of the electronic original object.

Figure 1A:
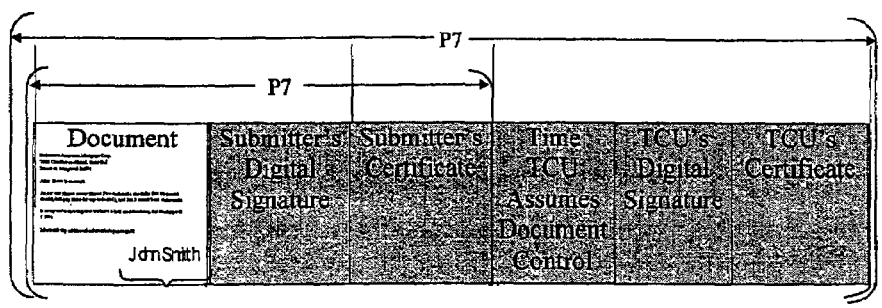
FIG. 1A illustrates the contents of an e-original in accordance with Applicants' inventions.

For the sake of brevity, the terms "e-original object" and just "e-original" will be used to refer to an authenticated information object created by a process involving a TCU and a Transfer Agent, and the term "deal" will be used to refer to a transaction or account that corresponds to or is defined by a set of e-originals. It will be understood that an e-original is itself an information object, and the underlying formatting of an e-original object enables parsing and processing for performing verification and validation of one or more of its digital signatures and authentication certificates, and extraction of the original contents for viewing or processing. Moreover, the term Transfer Agent as used in this application refers generally to an entity who attests to the integrity and validity of an information object before it is submitted to a TCU and who is authorized to submit such information objects to TCUs. FIG. 1A illustrates the content of an e-original according to Applicants' inventions, comprising an information object that is depicted as a text document hand-signed by "John Smith", a submitter's (Transfer Agent's) digital signature and certificate, a date-time stamp indicating when the TCU assumed control of the information object, the TCU's digital signature, and the TCU's certificate. The e-original is preferably formatted according to a message envelope/wrapper specification such as RSA PKCS#7 (identified by the reference character P7).

Secure audit, record tracking, and record management complete the technological aspects of maintaining an e-original. The TCU stores the e-original object in an account and controls access to the account for the benefit of the account owner and activities (e.g., retrieval upon request from authorized recipients as depicted by blocks 116, 118) permitted with respect to e-originals stored in the account. The e-originals are stored and the corresponding accounts are maintained by the TCU in any convenient form of memory, such as on optical and/or magnetic disks. Once a deal is completed and the associated e-original(s) are created by the TCU, the set of authorized parties who can access the TCU (e.g., through an electronic device such as a modem) to obtain or further transmit an e-original may change.

To maintain a trail, or chain, of evidence, the TCU applies version controls to e-originals in an account, thereby preventing direct modification of an e-original. An e-original in an account is replaced when an authorized party checks out and retrieves the e-original and submits an updated version; the replacement is elevated to the status of e-original, or authoritative copy. This kind of check out feature can be used to prevent another party from attempting to check out the same e-original. All prior versions of the e-original are advantageously maintained and all activity is tracked to discourage fraud. The combination of actions by the TCU, in conjunction with a protected audit trail, can be used at a future date to prove conclusively that a party initiated a deal, precluding an originator from denying that the object originated with that originator and providing irrevocable proof of authenticity.

Figure 2:
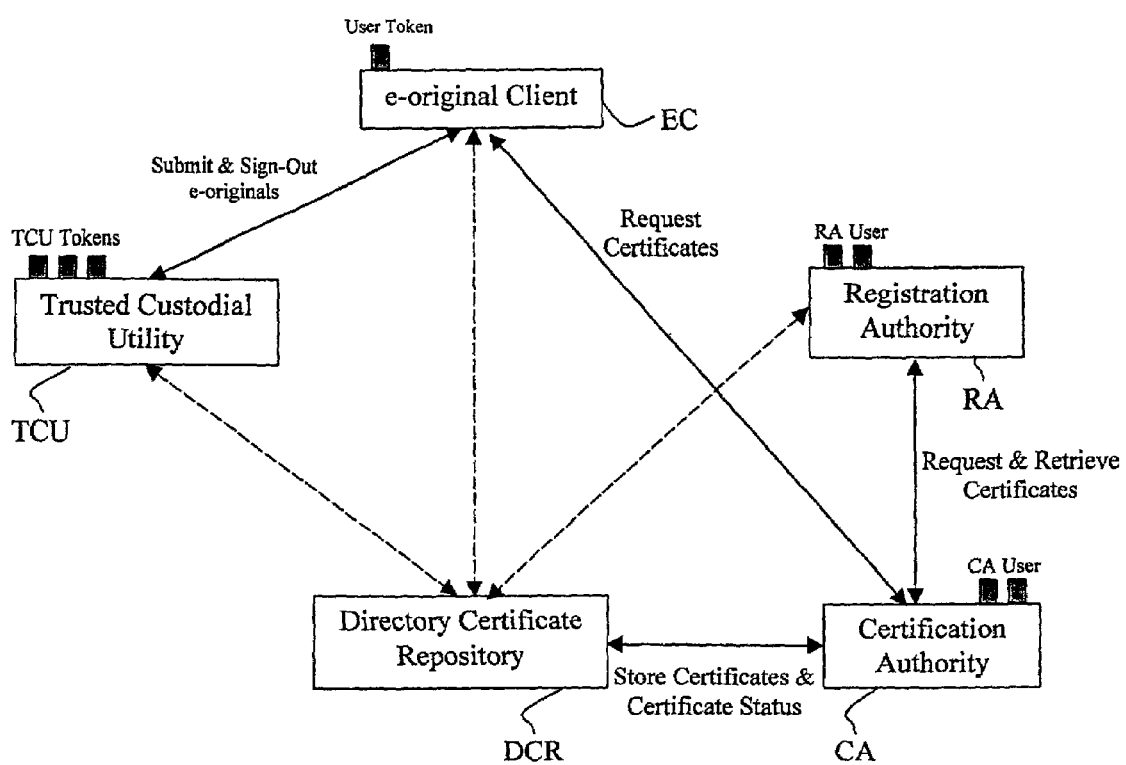
FIG. 2 is a block diagram of a document authentication system.

FIG. 2 is a block diagram of a DAS that is in accordance with Applicants' inventions and that corresponds to FIG. 1. FIG. 2 shows the interconnections between the Certification Authority CA, which issues, revokes, renews, and publishes certificates and keeps information on certificate status, including a certificate revocation list (CRL); the Registration Authority RA, which is empowered to request and retrieve certificates; an e-original client EC, which with a user Token in the possession of a Transfer Agent, retrieves and uses certificates and CRL and certificate status information; and the Trusted Custodial Utility TCU, which is an independent, trusted third-party custodian of information objects and is the holder of its own Token(s). As indicated in FIG. 2, the CA and RA may hold their own Tokens as well as one or more user Tokens (e.g., in connection with setup for Transfer Agent use). Although not indicated in FIG. 2, it will be appreciated that the TCU comprises at least one memory and at least one digital signal processor (DSP). Also shown in FIG. 2 is a Directory Certificate Repository DCR that stores and distributes certificates and CRLs and certificate status information. The DCR may in some embodiments be included in the Certification Authority CA.

Applicants' DAS relies on properly enrolled, or authorized, users (Transfer Agents), and an advantageous process of requesting certificates can be understood by considering FIG. 2. User PKI enrollment and certificate issuance is typically the responsibility of the CA, although the CA may delegate this responsibility to an RA located at a user-sponsoring organization so that face-to-face identification is possible. User enrollment information can then be entered directly at the CA or remotely at the RA, and in either case, a Token is allocated to the user. The allocated Token, such as a Smart Card, may be inserted into a local token reader and initialized, assigned default PINs, and commanded to generate a cryptographic key pair. The key pair may be assigned a reference handle, or name, so that the private key can later be associated with the authentication certificate when it is available. The Token is then commanded to export the public key. If these operations are conducted remotely, the user enrollment information and the public key may be used as the basis for a certificate request, which may conveniently have a form specified by the RSA PKCS #10 Certification Request Syntax Standard or by another suitable standard. Such a certificate request may be signed by the RA as proof of origin and then be transmitted to the CA.

On occasion, a user may be permitted to request the user's own authentication certificate. One such occasion is certificate renewal, but other instances may also be authorized (e.g., instances like those involving web browser secure sockets layer ("SSL") certificates).

Typically, a CA's established policy would dictate which parties can request certificates and for what purposes. Such policy would also dictate whether each request must be approved individually or whether all requests from particular RAs can be pre-approved. Once approved, whether the source of the enrollment is local or remote, the CA adds its own issuer information and signs the resulting X.509v3 certificate. If the request arrived from a remote source, the CA would deliver the certificate in a predetermined way (e.g., during the existing session, by providing a special URL for Internet access, or by e-mail). Once the certificate is available, the reference handle is used in loading the certificate into the user's Token and associating the certificate with the matching private key. The Token recipient would then typically select a Token password to ensure that only that recipient could use the Token for future DAS transactions.

With this preferred kind of organization, responsibility for certificate management is distributed. The PKI Root CA is responsible for creating a hierarchy of CAs and enforcing PKI policies. A CA and its administrator are responsible for creating subordinate CAs in the hierarchy, requesting, creating and revoking certificates, and managing Tokens. An RA is responsible for requesting certificates and managing Tokens. Subscribers, as well as the CA and RA, are consumers of certificates.

As described above, Applicants' verifiable chain of evidence or custody can be useful for many purposes besides simply indicating the provenance or pedigree of a document or object. For example, governmental entities might use a chain of custody to help compute and collect taxes or other levies. The TCU provides such an evidence chain by receiving an original executed or signed document and verifying the identity of the signer and the authenticity of documents received. The TCU retrieves CRLs from a directory, checks the CRLs for Certificate validity, and checks the expiration date of the Certificate. In one embodiment of the inventions, the Online Certificate Status Protocol (OCSP) can be used to check certificate validity. The TCU then generates a date-time stamp for the document received, and provides an integrity block (hash) that ensures that the document cannot be altered without detection. The integrity block is protected using a digital signature algorithm, and the evidence chain uses the integrity block and date-time stamp to provide notice and evidence of any alteration, even by a document's originator, if alteration is attempted after origination.

By first checking the authenticity of received digitally signed electronic objects, the TCU can assert that an object was valid on receipt. This assertion can extend for the remaining effective life of the TCU's authentication certificate. This assertion remains true unless a compromise of the Transfer Agent's secret signature key is reported. If such a report is received, the period of vulnerability must be determined, and if that period overlaps a deal, a review of all of that deal's e-originals is required. Where irregularities are found, appropriate remedial actions must be taken; this could amount to simply replacing one or more objects or in an extreme case to invalidating the deal. If no irregularities are found, the deal is assumed to remain valid. A report of a compromise occurring after completion of the deal has no effect on the authenticity of an e-original created before or during the time of execution of the corresponding deals.

In any event, it is important to realize that even the TCU's digital signature is not valid indefinitely but only during the validity period, or life, of its authentication certificate. This poses a problem for electronic objects that are intended to have legal weight for periods longer than the remaining validity period of a TCU's signature. For example, a thirty-year term is common for a home mortgage, and an indefinite term is common for an outright sale of property.

Two methods in accordance with Applicants' inventions are described below that in effect extend the validity periods of e-originals for a DAS handling long-lived information objects. The first method is called "digital-signature chaining" and the second method is called "object-inventory versioning".

Figure 3:
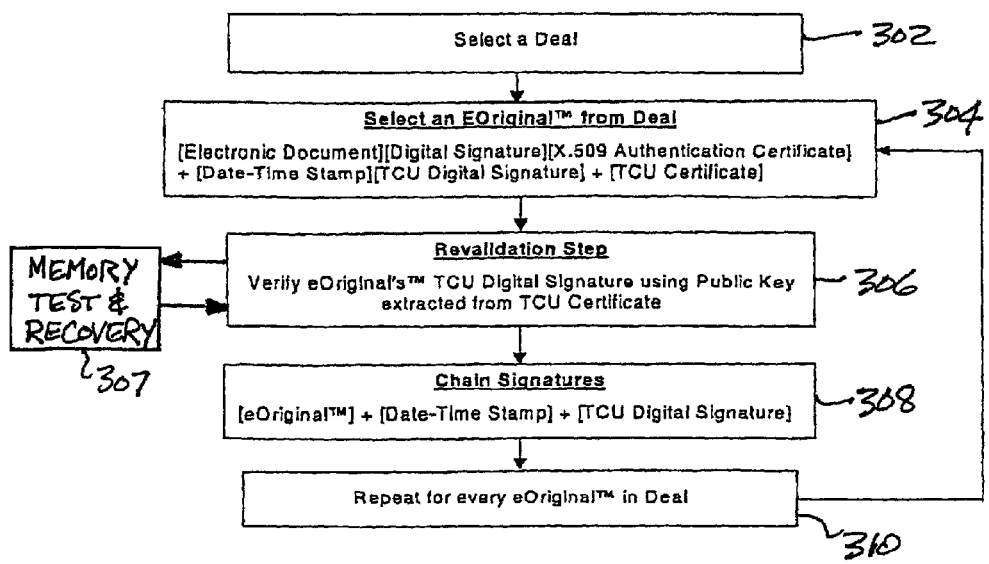
FIG. 3 is a flowchart of a digital-signature chaining method in accordance with Applicants' inventions.

FIG. 3 is a flowchart of Applicants' digital-signature chaining method, which generally involves repeated application of date-time stamps and TCU signatures and certificates. The first step 302 of the digital-signature chaining method is selecting a deal to which the remainder of the method is applied. The next step 304 is selecting an e-original from the selected deal. As noted above, an e-original generally comprises (1) an information object, (2) at least a Transfer Agent's signature appended to the information object, and preferably a digital signature and an authentication certificate for the digital signature, (3) a TCU's date-time stamp, (4) a TCU's digital signature, and (5) the TCU's authentication certificate.

The selected e-original is re-validated in step 306 by verifying the TCU's digital signature on the e-original using the TCU's public key that is derived from the TCU's authentication certificate. Validating a signature block that contains only a TCU's digital signature is sufficient to verify the respective e-original, which is convenient for regular re-validations by the TCU of e-originals in the course of testing for correct memory retention (step 307). When used with high reliability storage (e.g., RAID), such regularly scheduled re-validation may be relied on rather than repeating the revalidation process. In general, the TCU's digital signature is "verified" by providing a newly computed hash value, the public key extracted from the certificate, and the electronic object's digital signature as inputs to the verification algorithm, which will report success only if the document is unchanged. It will be appreciated that the hash is computed over the e-original contents up to, but not including, the TCU outermost digital signature that is being verified. There is no need to re-verify inner signatures, since the outer signature prevents any modification. In general, the outermost signature (e.g., of the TCU, in FIG. 1A) is all that is needed for verification.

If these checks are affirmative, then the TCU's digital signature remains valid from the time the e-original was previously digitally signed, and the selected e-original is re-validated and the method advances to the next step 308. In step 308, a current date-time stamp, a digital signature newly computed by the TCU, and the TCU's current authentication certificate are appended to the re-validated e-original. Finally, step 310 provides for repeating steps 304–308 for each e-original corresponding to the deal selected in step 302.

Figure 3A:
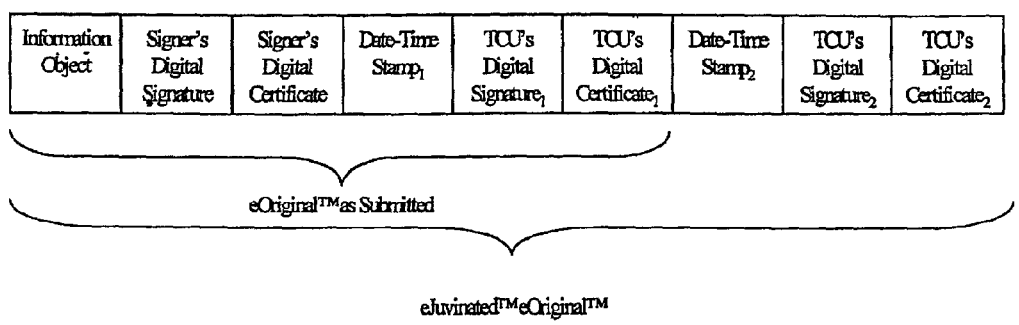
FIG. 3A illustrates the contents of an e-original produced by Applicants' digital-signature chaining method.

FIG. 3A depicts the result of one pass through Applicants' digital-signature chaining method on an e-original such as that depicted in FIG. 1A. Comparing FIG. 3A to FIG. 1A, it can be seen that another set of a date-time stamp, TCU digital signature, and TCU digital certificate are added to the e-original selected for re-validation. It will be noted that a re-validated e-original as depicted in FIG. 3A is itself an e-original.

Applicants' second method of extending the validity periods of e-originals for a DAS handling long-lived information objects is called "object-inventory versioning" and involves the creation and maintenance for a deal of an e-original called an "object-inventory". As an e-original, an object-inventory generally has the characteristics depicted in FIG. 1A. At appropriate stages in a deal's evolution (e.g., at deal closing), the deal's "object-inventory" may be checked out of the TCU, be digitally signed, and be re-submitted to the TCU by the deal's owner or authorized agent to signify the owner's/agent's own actions or accord with TCU actions, such as acknowledgment, ratification, transfer, etc.

Figure 4:
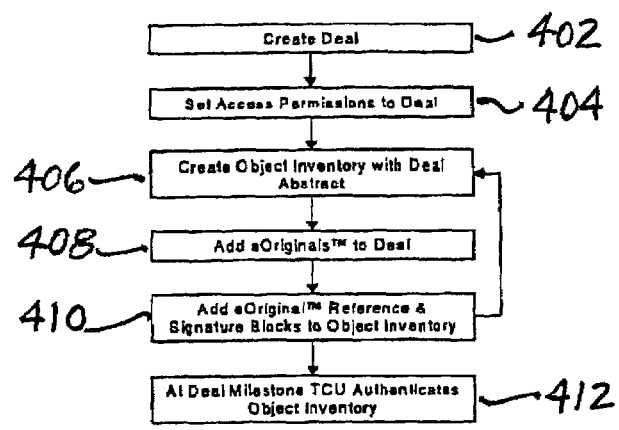
FIG. 4 is a flowchart of a method of creating an object-inventory in accordance with Applicant's inventions.
Figure 4A:
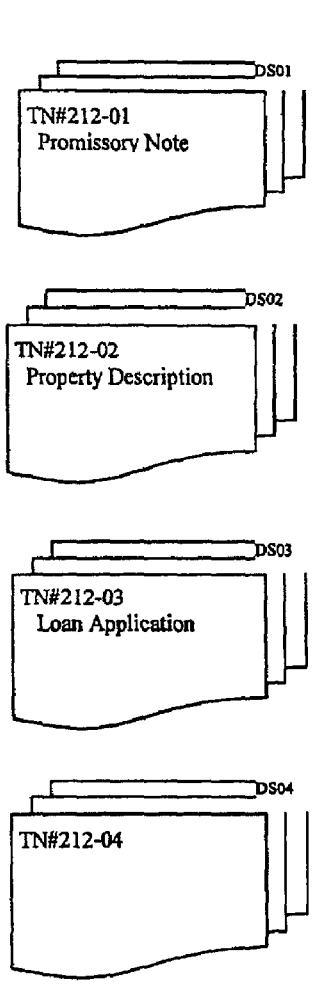
FIG. 4A depicts an object-inventory for a deal.

FIG. 4 is a flow chart of a method of creating an object-inventory for a respective deal that is preferably carried out by the TCU. An object-inventory is a list of object identifiers and associated signature blocks for e-originals corresponding to a deal, and FIG. 4A depicts an exemplary object-inventory for a deal relating to a mortgage on property. It can be desirable to include in the object-inventory an abstract of the respective deal, and such an abstract may indicate a transaction number, an object-inventory number, the deal's type, value, subject matter, parties, etc., which are items of information that are typically useful in post-deal activities. In FIG. 4A, the deal abstract is indicated by the information above the horizontal line: [TN#212, OI#2-01 30_Mortgage@7% Property_Description Lender, Borrower]. Each entry on the list of object identifiers, such as TN#212-01 TCU-DS01; TN#212-02 TCU-DS02; etc., refers to an object that is depicted below the object-inventory in FIG. 4A. For a deal relating to a mortgage on property, such objects might include a promissory note, property description, loan application, etc. At least some of the information in the abstract would typically be provided to the TCU by the deal participants and/or the Transfer Agent(s).

An object-inventory preferably is an e-original that is internal to a TCU, although it is possible, if desired, to add enough details of the deal to the abstract included in the object-inventory so that the object-inventory can serve as an "authenticated account record", which will be understood as similar to registries and book-entry systems that have paper event trails. As used in connection with Applicants' e-originals, an authenticated account record represents a trail of evidence that can stand on its own and be used independently of other procedures available on Applicants' system.

Object identifiers are record identifier values, index values, or the like that are sufficient for locating e-originals corresponding to respective deals in the TCU. A signature block can contain as little as the TCU's digital signature and authentication certificate on a deal's e-originals or as much as the digital signatures and authentication certificates of the deal's participants and Transfer Agent(s) and the TCU's date-time stamp, digital signature, and authentication certificate. Validating a signature block that contains only a TCU's digital signature and certificate is sufficient to verify the respective e-original, which is convenient for regular re-validations by the TCU of e-originals in the course of testing for correct memory retention. Thus, it will be understood that validating an object-inventory requires checking the internal signature blocks against the corresponding e-originals using the identifiers and then validating the object-inventory's TCU digital signature.

The first step 402 of the method is creating in the memory of the TCU a logical association among the participants and Transfer Agents known to the TCU as corresponding to the deal. Of course, the "creation" of step 402 may instead involve selecting a deal that has already been created In the next step 404, the TCU sets access permissions for the deal based on instructions it has received from the deal's owner. In the absence of instructions to the contrary, the participants may be the only parties permitted access to the deal (e.g., the corresponding e-originals), although it is expected that third parties will also be permitted access and that the identities of those third parties can change from time to time.

The deal's object-inventory is created in steps 406, 408, 410, which build up the object-inventory by adding references to the deal's e-originals one by one (see FIG. 4A) so that at an appropriate time (step 412), such as after a suitable act (e.g., checking out, digitally signing and appending a certificate, and re-submitting the object-inventory to the TCU) by the deal's owner or the owner's authorized agent, the TCU can append its date-time stamp, digital signature, and authentication certificate, thereby transforming the object-inventory into an e-original. For example, the first pass through step 406 may simply link the deal abstract to the object-inventory, either by adding a record identifier or index locating the deal abstract in the TCU's memory to the object-inventory or by incorporating the deal abstract into the object-inventory. Of course, this typically needs to be done only once for a given object-inventory. With each pass through step 408, the object identifier of an e-original corresponding to the deal is linked to the object-inventory by incorporation. It will be appreciated that it is not necessary to link the e-original identifiers of a deal's information objects to an object-inventory one at a time; some or all can be linked at the same time. As noted above, step 410 depicts that signature blocks containing at least the TCU's digital signature on the deal's e-originals are linked to the object-inventory, either by adding indices locating the signature blocks in the TCU's memory to the object-inventory and/or by incorporating the signature blocks into the object-inventory.

The TCU transforms the object-inventory into an e-original as depicted in step 412 by adding its date-time stamp, digital signature, and certificate. (In FIG. 4A, the object-inventory is depicted as advantageously including the information: 11/02/1997 10:20PM]OI02, which represents a date-time stamp (11/02/1997 10:20PM) and an object-inventory version number (OI02, i.e., the version 2 of the object-inventory). Since digitally signed information objects corresponding to a deal may be submitted to TCU and transformed into e-originals at various times, it can be advantageous for the TCU to carry out step 412 at a time or times specified by owner instructions corresponding to the respective deal or after an act by the owner/agent, e.g., signing out the object-inventory from the TCU, digitally signing it, and re-submitting it to the TCU.

It will be noted that the signature block of each e-original corresponding to a deal is preferably re-validated in step 410, as re-validation is described in connection with FIG. 3, before that e-original is included in an object-inventory for that deal. Nevertheless, in some cases it can be enough to rely on a re-validation that may have been performed for other reasons, e.g., a re-validation performed in the course of periodic memory testing (see step 307 in FIG. 3). Upon deal completion or at other times, the object-inventory is authenticated in step 412 by the TCU by appending the current date-time stamp and its certificate and by digitally signing the object-inventory.

Figure 5A:
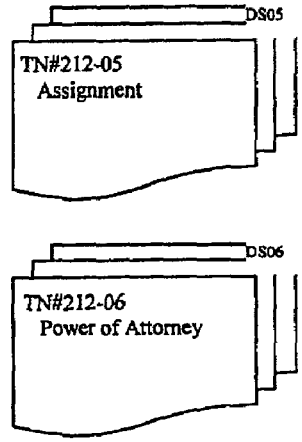
FIG. 5A depicts an object-inventory at a later stage of the deal depicted in FIG. 4A.
Figure 5:
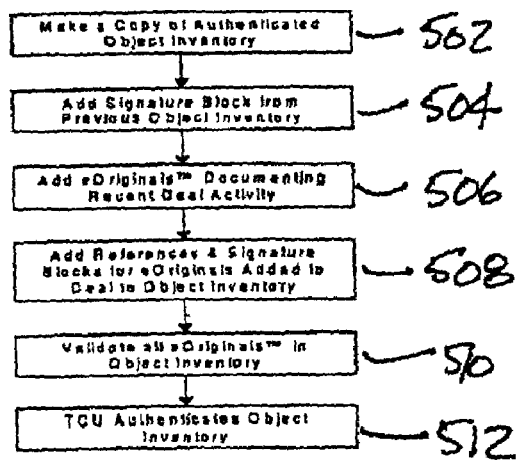
FIG. 5 is a flowchart of an object-inventory versioning method in accordance with Applicants' inventions.

FIG. 5 is a flowchart of an object-inventory versioning method in accordance with Applicants' inventions that operates on object-inventories that have already been created, for example in the manner depicted in FIG. 4, in order to reflect subsequent deal activity, to extend the validity periods of digital signatures associated with the object-inventory, etc. FIG. 5A depicts an object-inventory produced by operation of the method of FIG. 5 for a later stage of a deal having the object-inventory depicted in FIG. 4A. In step 502, the TCU forms a copy of a selected e-original object-inventory, and in step 504, the TCU adds to the copy a record identifier or index and signature block derived from the selected object-inventory.

If the purpose of executing the method depicted in FIG. 5 is to reflect deal activity subsequent to the creation of the selected object-inventory, step 506 carries out substantially the same functions as step 408 of FIG. 4, in that object identifiers of subsequently submitted e-originals corresponding to the deal are linked to the copy of the selected object-inventory by incorporation. As in step 410 described above, step 508 depicts that signature blocks containing at least the TCU's digital signature on the deal's subsequently submitted e-originals are linked to the copy of the selected object-inventory, either by adding indices locating the signature blocks in the TCU's memory or by incorporation. A resulting object-inventory is illustrated in FIG. 5A for the situation in which two objects, identified by TN#212-05 and TN#212-06, have been added to the deal illustrated by FIG. 4A.

Whether the purpose of executing the method is to reflect subsequent deal activity or to extend the validity periods of digital signatures, the TCU validates all of the e-originals included in the copy of the selected object-inventory (step 510). The TCU then authenticates the copy of the selected object-inventory (step 512), by transforming the copy into a new e-original object-inventory by adding its date-time stamp, digital signature, and preferably authentication certificate. This is depicted in FIG. 5A by the information: 11/06/97 11:00PM]OI03. It may be noted that date-time stamps when applied are preferably always current time, and version 3 of the object-inventory (identified by OI03) is preferably the immediate successor of the version 2 (identified by OI02).

Applicants' digital-signature chaining and object-inventory versioning methods are expected to be useful in a wide range of environments. The following description is not meant to suggest that the digital-signature chaining method is superior to the object-inventory versioning method or vice versa. It will be appreciated that either method may be better suited for a specific operational environment based on the characteristics of that environment.

In general, the TCU has twin responsibilities of ensuring the integrity of e-originals retained in its database and the integrity of its database. It is important to note, however, the TCU's digital signature on an e-original must be validated, when using either method, before carrying out any subsequent action involving adding an additional digital signature. This reaffirms (updates) the authenticity of the subject e-original, whether the subject e-original is a transformation of a submitted information object or an object-inventory.

Moreover, both methods involve substantially the same steps, but only up to a point. In the digital-signature chaining method, the TCU's current date-time stamp, digital signature, and certificate are appended to every e-original that corresponds to a deal. In the object-inventory versioning method, the TCU's current date-time stamp and digital signature are appended to an e-original (i.e., the object-inventory) that comprises other e-original object references and TCU signatures. After the object-inventory is date-time stamped and digitally signed by the TCU, the procedures diverge in their handling of subsequent deal activity. No change in processing is seen in the digital-signature chaining method, but in the object-inventory versioning method, only new e-originals resulting from subsequent deal activity are added to a copy of the previous object-inventory and only such new e-originals, including the previous object-inventory, must have their TCU signatures re-validated, which includes a verification of the TCU's digital signature on each added e-original. If a deal is moved between TCUs, then every e-original must also be re-validated. In any instance where a new deal is created, adjustments may be made to the access permissions of the new and existing accounts.

Thus, it will be recognized that the object-inventory versioning method relies on the TCU to maintain the integrity of all previously entered e-originals, yielding considerable operational savings in the TCU because only the new version of the object-inventory needs to be date-time stamped and digitally signed by the TCU. Moreover, object-inventories that relate to a given deal are each the product of a cascade of preceding object-inventories relating to that deal and have a secure audit trail built into them. It will be recognized, however, that the strength of systems and methods in accordance Applicants' inventions does not derive solely from the secure audit trail but is also derived from the updates, or refreshes, of the cryptographic techniques used that are enabled by both the digital-signature chaining and object-inventory versioning methods.

The following describes exemplary uses of Applicants' digital-signature chaining and object-inventory versioning methods. These uses are not intended to be exclusive since it is believed Applicants' methods are widely applicable to electronic commerce and other environments involving manipulation of information objects.

1. As noted above, the digital-signature chaining and object-inventory versioning methods can be used to extend about-to-expire validity periods of digital signatures on e-originals. This can be called an eJuvination™ process. As an initial matter since the validity period of the TCU's digital signature effectively defines the life of an e-original, the TCU sends a renewal request to and retrieves a replacement authentication certificate from the PKI before expiration of the TCU's authentication certificate such that the validity period of the replacement certificate overlaps the validity period of the previous certificate and extends for a specified period as dictated by cryptographic algorithm strength and threat analysis. In general, a state-of-the-art signing algorithm is always used to maximize the probability that the certificate will remain viable throughout the validity period.

(a) The digital-signature chaining method entails performing "e-original re-validation" and appending a current date-time stamp, the new TCU digital signature, and preferably the current TCU authentication certificate to an e-original, e.g., every e-original corresponding to one or more deals or every e-original stored in the TCU. "e-original re-validation" refers to the process described above in connection with FIG. 3 in which an e-original has its TCU digital signature verified in a cryptographic process that checks that the contents of the e-originals have not changed from when they were submitted to the TCU. The TCU preferably employs known recovery technology (e.g., RAID, backup tapes or disks, and other known disaster recovery techniques) so that any detected change can be automatically rectified. (See step 307 in FIG. 3.) This is particularly important when e-originals are transferred from one storage medium to another or from one system (TCU) to another, and in appropriate circumstances might be done without involving the object originator or deal participants. In the case of TCU-to-TCU transfer and on detection of an error, the receiving system would request restoration and re-transmission.

(b) The object-inventory versioning method extends the life of the one or more e-originals represented in an authenticated object-inventory as described above in connection with FIGS. 4, 5. A copy of the contents of an object-inventory, with the addition of the copied object-inventory's identifier and signature block is made, and after e-original re-validation, the TCU appends the current date-time stamp, its new digital signature, and authentication certificate to the new object-inventory. This method provides a demonstrable cryptographically linked chain-of-evidence.

In both methods the actions taken result in extending the effective life of every e-original to which the methods are applied, but as noted above, the object-inventory versioning method may be more advantageous than the digital-signature chaining method. In eJuvination™, if there were 10,000 deals with an average of 40 objects per deal, for example, the digital-signature chaining method would require 400,000 verifications and appending 400,000 date-time stamps and TCU digital signatures and authentication certificates. The object-inventory versioning method would require just 10,000 verifications and appending 10,000 date-time stamps, digital signatures, and authentication certificates (i.e., creating a copy (new version) of the object-inventory, validating the TCU signature on the previous version of the object-inventory, adding a reference to the previous object-inventory to the new version, and date-time stamping, digitally signing, and appending the authentication certificate to the new version of the object-inventory). Again, it will be understood that "verification" involves checking a digital signature and "validation" involves checking a digital signature and certificate status. In this example, verification is used to check content integrity and validation is used also to insure that the TCU certificate is valid.

2. The digital-signature chaining and object-inventory versioning methods can be used in a transfer-of-custody process that would implement a suitable instruction or instructions submitted by the deal's owner or authorized agent to a TCU and requiring transfer of one or more deals to another TCU. The instruction(s) preferably would be transformed into an e-original(s) and retained by both TCUs, and the new TCU would set up the required number of accounts and deals. The new TCU's certificate must overlap the old TCU's certificate. In addition it may be advantageous for the new TCU to request a new certificate to ensure extending the life of transferred e-originals for the maximum period allowed.

(a) In accordance with the digital-signature chaining method, all e-originals corresponding to a designated deal or deals would be exported to the new TCU after being processed according to the method. The new TCU would carry out the e-original re-validation process on the imported e-originals one by one, append the current date-time stamp and preferably its authentication certificate to each re-validated e-original, and digitally sign each imported stamped e-original. This action would affirm transfer-of-control and custody to the new TCU and would extend the life of all previously affixed digital signatures to the life of the new TCU's digital signature. This process would be repeated for each deal to be transferred.

(b) In accordance with the object-inventory versioning method, the object-inventory and e-originals corresponding to a designated deal or deals would be exported to the new TCU. The current object-inventory (i.e., the list of record identifiers or indexes to e-originals making up the deal) would be used by both TCUs to ensure that all e-originals were transferred. The new TCU would carry out the e-original re-validation process on the imported e-originals one by one, make a copy of the imported (latest version) of the object-inventory, and add the copied object-inventory's identifier and signature block, which are the identifier and signature block from the old TCU. The new TCU preferably would obtain approval of the object-inventory by the deal's owner or authorized agent by requesting that the owner/agent check out the object-inventory, appropriately update the deal abstract, signify approval by digitally signing and submitting the new object-inventory. On submission of the digitally signed new object-inventory, the TCU would perform signature validation, append the current date-time stamp, and digitally sign and attach the TCU's authentication certificate to the new object-inventory. This action would affirm transfer-of-control and custody to the new TCU and extend the life of all previously affixed digital signatures to the life of the new TCU's digital signature. This process would be repeated for each deal to be transferred.

In both methods, the old custodian (TCU) would be notified upon successful transfer-of-custody, and the old TCU could then archive and/or remove the deal(s) from its database.

3. The digital-signature chaining and object-inventory versioning methods can be used in a transfer-of-ownership process that would implement a suitable instruction or instructions and appropriate documentation (e.g., an assignment document, a power-of-attorney document, etc.) that would be submitted to the TCU having custody of the subject deal or deals. The instruction and documentation would be transformed into e-originals and added to the subject deal or deals. The TCU, as instructed by the deal's owner or agent, could either create a new deal in the new owner's account and transfer all documentation into it or simply change (update) the deal and account designation. The TCU could also change nomenclature used in the transferred e-original(s) to conform to nomenclature preferred by the new owner.

(a) In accordance with the digital-signature chaining method, the TCU would perform e-original re-validation, append the current date-time stamp, and digitally sign all e-originals involved in the transfer.

(b) In accordance with the object-inventory versioning method, the TCU would make a copy of the latest version of the object-inventory, perform e-original re-validation, add the new e-original(s) authorizing the transfer-of-ownership and a reference to the copied object-inventory to the new object-inventory, request owner approval (e.g., by having the owner check out the object-inventory, appropriately update the deal abstract, and signify approval by digitally signing and submitting the new object-inventory), and validate the owner's digital signature before appending the TCU's current date-time stamp, digitally signing, and attaching the TCU's authentication certificate to the new object-inventory.

In both methods, these actions would affirm the transfer-of-ownership. The TCU could then close the old account or remove the transferred deal from the account and archives and/or purge its objects as appropriate.

4. The digital-signature chaining and object-inventory versioning methods can be used in a transfer-of-rights process, in which the rights transferred would be less than full ownership of the associated e-original(s) and the financial assets represented by them. In general, one or more rights established in a deal or deals (e.g., revenue stream, servicing, etc.) could be sold or otherwise transferred. The transfer-of-rights process would be implemented in response to a suitable instruction or instructions and appropriate documentation submitted by the deal's owner or authorized agent to the TCU having custody of the deal(s). The instruction and documentation would be transformed into e-originals and added to the subject deal(s). The TCU, as instructed by the deal's owner, could either create a new account and transfer only the appropriate e-originals (all or a subset) representing the transfer-of-rights into the new account or create a new deal in an existing account and transfer only the appropriate e-originals (all or a subset) into the new deal.

(a) In accordance with the digital-signature chaining method, the TCU would perform e-original re-validation, append the current date-time stamp, and digitally sign all e-originals involved in the transfer.

(b) In accordance with the object-inventory versioning method, the TCU would make a copy of the latest version of the object-inventory, perform e-original re-validation, add the new e-original(s) authorizing the transfer-of-rights and a reference to the copied object-inventory to the new object-inventory, request owner approval, and validate the owner's digital signature before appending the TCU's current date-time stamp, digitally signing, and attaching the TCU's authentication certificate to the new object-inventory.

In both methods, these actions would affirm the transfer-of-rights.

5. The digital-signature chaining and object-inventory versioning methods can be used in a syndication process, in which the owner would retain partial ownership of a deal, but the remainder would be sold to other parties. Such a sale or sales might include pro-rata rights to a revenue stream derived from the deal and a corresponding default risk. The syndication process would be implemented in response to a suitable instruction or instructions and appropriate documentation that would be submitted by the deal's owner or authorized agent to the TCU having custody of the deal(s). The instruction(s) and documentation would be transformed into e-originals and added to the subject deal(s). The instruction(s) could provide for granting appropriate access to the deal to potential members of the syndicate, and as shares were sold and new members added, for adding further documentation to the deal (that would be transformed into one or more e-originals) identifying the new owners and their percentage of ownership. Once the syndicate was completely formed, access to the deal would be removed for all parties who were not part of the syndicate.

(a) In accordance with the digital-signature chaining method, the TCU would perform e-original re-validation, append the current date-time stamp, and digitally sign all e-originals involved in the syndication.

(b) In accordance with the object-inventory versioning method, the TCU would make a copy of the latest version of the object-inventory, perform e-original re-validation, add the new e-original(s) created during the syndication and a reference to the copied object-inventory to the new object-inventory, request owner approval, and validate the owner's digital signature before appending the TCU's current date-time stamp, digitally signing, and attaching the TCU's authentication certificate to the new object-inventory.

In both methods, these actions would affirm the time of syndication closure.

6. The digital-signature chaining and object-inventory versioning methods can be used in a process of securitization, for example of a loan or lease portfolio, in which a "special-purpose company" would be formed with the originating company retaining the default risk of the portfolio and the rights to the revenue stream being sold off in exchange for a one-time payment. The securitization process would implement a suitable instruction or instructions and supporting documentation that would be submitted to the TCU having custody of the deal(s). The instruction and documentation would be transformed into e-originals and added to the subject deal(s). The TCU would create an account for the special-purpose company and move the e-originals representing the financial assets into that account. Individual accounts could be swapped into or out of the securitization portfolio, for example as results of defaults and terminations.

(a) In accordance with the digital-signature chaining method, the TCU would perform e-original re-validation, append the current date-time stamp, and digitally sign all e-originals involved in the securitization.

(b) In accordance with the object-inventory versioning method, the TCU would make a copy of the latest version of the object-inventory, perform e-original re-validation, add the new e-original(s) created during the securitization and a reference to the copied object-inventory to the new object-inventory, request owner approval, and validate the owner's digital signature before appending the TCU's current date-time stamp, digitally signing, and attaching the TCU's authentication certificate to the new object-inventory.

In both methods, these actions would affirm the time of securitization closure.

7. The digital-signature chaining and object-inventory versioning methods can be used in a process of negotiability, in which an offer, counter-offer, acceptance, and/or rejection would be documented in the TCU. The necessary actions associated with the offer and acceptance would be performed. The object of negotiation could include delivery of electronic information objects of intrinsic or extrinsic value, in which case the objects could be accompanied by a "proof-of-authenticity", appraisal, and supporting ownership documentation. Such documentation would be transformed into an e-original upon submission to the TCU. As in all of the uses of Applicants' methods that are described above, if a new account needed to be formed and e-originals transferred, those actions would occur only after appropriate instruction(s) and approval action(s) were received from the deal's owner.

(a) In accordance with the digital-signature chaining method, the TCU would perform e-original re-validation, append the current date-time stamp, and digitally sign all e-originals involved in the negotiation.

(b) In accordance with the object-inventory versioning method, the TCU would make a copy of the latest version of the object-inventory, perform e-original re-validation, add the new e-original(s) created during the negotiation and a reference to the copied object-inventory to the new object-inventory, request owner approval, and validate the owner's digital signature before appending the TCU's current date-time stamp, and digitally signing and attaching the TCU's authentication certificate to the new object-inventory.

In both methods, these actions would affirm the time of deal fulfillment (completion of negotiation). As described in more detail below, Applicants' methods can support negotiability in many forms of electronic commerce in which ownership rights and e-original value are established and preserved (e.g., distribution of electronic original art, software licensing, etc.).

8. The digital-signature chaining and object-inventory versioning methods can be used in a process of agency authorization, whereby for example an individual or organization could satisfy tax, regulatory, and company accounting requirements for an expense account by submitting expense receipts and authorizations to a TCU, in which they would be held as e-originals that could be conveniently organized, for example in folders by year and month. The company would be enrolled in the DAS and would control access to such account folders, providing access to one or more folders as required for audit or tax purposes. The above-described process of eJuvination™ would be performed on such an account as required to insure continued legal and regulatory compliance.

For example, an employee might purchase an item by using a credit card, thereby generating a transaction record in the card-issuer's authorization center. Such records would be extracted from the authorization center, and perhaps organized by expense category. The organized transactions would be digitally signed and submitted to a TCU by a Transfer Agent. The employee would then select desired transactions from the TCU and assign those transactions to an expense report, which may also include entries for expenses not purchased by using the credit card. The employee would then digitally sign the expense report, attach his or her authentication certificate, and submit the report to his or her employer for approval. The employer would digitally sign the report, append its authentication certificate, and submit the information to the TCU. It will be appreciated that the employer could also conveniently provide information in the report to its accounting system for paying the credit card charges and reimbursing the employee for other entries. It will also be appreciated that in this kind of "deal", several entities can take responsibility for submitting information objects that are transformed into e-original objects.

Both digital-signature chaining and object-inventory versioning methods would achieve the same results, but the digital-signature chaining method is currently believed to be simpler than the object-inventory versioning method for this use. The tradeoff as described above is file size vs. computational overhead.

The uses for transfers of ownership and rights, syndication, securitization, and negotiation are described above as internal processes of a particular TCU, but it will be understood that this is not necessary. More than one TCU may be involved in such uses, all of which can be seen to have overlapping aspects. Accordingly, this description should not be understood as limiting the application of Applicants' inventions to these uses but as encompassing these, combinations of these, and all others that fall within the scopes of the appended claims.

It can be seen from the description above that Applicants' inventions are useful in a wide variety of commercial and other transactions. For example, transfers of stored authenticated information objects according to suitable instructions can occur "internally" (without retrieving a stored object) or "externally" (by retrieving an object and providing it to another). Also, establishment of a verifiable evidence chain, or chain of custody, by date and time stamping an object, signing with another digital signature, appending another certificate, and storing the resulting object are described. Accordingly, Applicants' inventions enable sales, assignments, and other ownership transfers of authenticated information objects, which may have intrinsic value, like electronic artistic works, as well as extrinsic value, like notes and securities.

It will be understood, of course, that Applicants' inventions can also be used in connection with any information object, including information objects that are explicitly neither intrinsically nor extrinsically valued. Although every information object may be considered to have at least an implicit value, whether intrinsic or extrinsic, objects having only implicit value may be thought of as "non-economic" objects that include all kinds of personal, business, or legal records (such as laboratory notebooks, corporate records, litigation files, computer source code, computer executable code, databases, data compilations, etc.). Thus, the term "deal" will be understood in this application as relating to more than just an economic transaction.

It will be appreciated that Applicants' inventions are not limited to such scenarios, however, but rather also enables a wide variety of transactions, including, for just one example, contract formation by an authenticated offer (an information object) that may be retrieved or distributed to one or more entities according to suitable instructions from the owner of the information object. An entity's acceptance or counter-offer, as well as a final agreement, can be information objects that would be subsequently received in relation to the transaction of contract formation. It may be noted that the originator of an information object may be the entity that digitally signs and appends a certificate to the information object.

Such scenarios benefit substantially from Applicants' systems and methods that implement PKC for the registration and transfer of ownership of stored original authenticated electronic records or objects. A trusted third party, the TCU, performs the storage, custodial, and registry functions for the benefit of the owner of the electronic record. Applicants' systems and methods make it possible to establish ownership of electronic records, and to provide irrefutable proof when a transfer of ownership takes place. This supports stranger-to-stranger transfers, which in the following example involves three steps (an offer, an acceptance, and a record of transfer) that are independently performed by the offer's owner, the offer's recipient, and the trusted third party, respectively. In accordance with Applicants' inventions, an object's current owner, the owner's offer to one or more potential buyers, and the acceptance of the offer by a buyer(s) are identified, and a chronicle evidencing the transfer is created. From this example, the withdrawal of an offer anytime prior to its acceptance and the transfer of the record can also be seen.

To begin this example, an information object, be it a document, negotiable instrument, or other valuated or non-economic object, would be under the control of the TCU, and a first party wishes to transfer the authenticated object to a second party. The first party would propose to transfer the authenticated object to the second party by signing out (retrieving) the authenticated object from the trusted repository, attaching instructions to the authenticated object, and transmitting the object and instructions/terms of transfer to the second party by a secure transmission means. Traditional paper transfers would use transmission means such as a courier or registered mail. Since the information object in this example is electronic and is protected by the methods and apparatus described in this application, secure electronic means could be used to transmit the object and its instructions; for example, these electronic means could include the first party's applying a digital signature to the authenticated object and the associated instructions.

The second party would receive the transmitted authenticated object and instructions, and might decide to accept the offer. The second party could then present the accepted offer/object and instructions to the TCU (trusted repository), which would effect transfer of ownership of the object as instructed, e.g., after proof of payment is received either by the first party or the TCU. Alternatively, the second party could communicate its acceptance of the offer to the first party, who would then transfer this acceptance in the form of instructions to the repository to assign ownership of the object to the second party. In either case, the actual transfer or assignment of ownership would occur at the TCU, which would validate the digital signature of the new owner (the second party) on object, apply a date-time stamp, and sign all of this with its own digital signature. Of course, the terms of transfer from the first party to the second party (instructions) might provide for rescission of the offer by the first party at any time or subsequent to a specified time, in which case the first party could rescind the offer by instructing the TCU to assign ownership of the object to the first party itself, in effect simply replacing the first party's prior ownership with a "new" ownership by the first party.

The preceding example can be expressed more economically for the symbolically inclined as follows:

| | |
|---|---|
| Offer from B to C | $S_b(S'_{TCU}(S_b(S_a(Object))), Cert_c, Qual)$ |
| Acceptance C to TCU | $S_c(S_a(Object)), S_b(S'_{TCU}(S_b(S_a(Object))), Cert_c, Qual)$ |
| Alternative acceptance | $S_c(S_c(S_a(Object)), S_b(S'_{TCU}(S_b(S_a(Object))), Cert_c, Qual))$ |
| Transfer by TCU to B&C | $S'_{TCU}(S_c(S_a(Object)))$ | where (Object) is, e.g., a document, fax, graphic, certificate, promissory note, etc.; Cert is irrefutable proof of user identity when used with secret key (e.g., an X.509 certificate); $S_a$ is the digital signature of party A, e.g., the originator of a secured object; $S_b$ is the digital signature of party B, e.g., the first party to obtain ownership of the secured object; $S_c$ is the digital signature of party C, e.g., a second party, potential new owner of the secured object; $S'_{TCU}$ is the digital signature and time stamp of the TCU; $S_a(Object)$ is the object digitally signed by A; $S_b(S_a(Object))$ is the authenticated (secured) object; $S'_{TCU}(S_b(S_a(Object)))$ is the authenticated object stored by the TCU; and Qual represents the qualifications or instructions on the offer that may govern the TCU's actions (e.g., accept the first received response, accept the highest response, accept a response greater than an amount, response closing date, payment received, etc.). For counter-offers, Qual might take the form of, for example, accept contingent on, after date, bid, etc.

The signed object $S_a(Object)$ is created by $S_a$, the ownership of which by $S_b$ is denoted by $S_b(S_a(Object))$. $S_b$ submits the signed object to the TCU, which creates $S'_{TCU}(S_b(S_a(Object)))$, the authenticated object. The TCU records, registers, and controls $S'_{TCU}(S_b(S_a(Object)))$, which becomes the responsibility of the TCU. $S_b$ makes the offer to $S_c$, which is denoted $S_b(S'_{TCU}(S_b(S_a(Object))), Cert_c, Qual)$, where the inclusion of Cert indicates intended recipient(s) of the offer and the inclusion of the instructions Qual defines terms that must be enforced by the TCU. $S_c$ accepts the offer by re-signing $S_a(Object)$, thereby creating $S_c(S_a(Object))$, which with $S_b(S'_{TCU}(S_b(S_a(Object))), Cert_c, Qual)$ is transmitted to the TCU to initiate transfer of ownership. The TCU validates the offer and determines if the Qual is satisfied. If both actions check, the TCU time-stamps and signs the offer and acceptance, effecting the transfer by creating $S'_{TCU}(S_c(S_a(Object)))$, and for audit purposes the TCU creates $S'_{TCU}(S_b(S'_{TCU}(S_b(S_a(Object))), Cert_c, Qual))$. The TCU records, registers, and controls $S'_{TCU}(S_b(S'_{TCU}(S_b(S_a(Object))), Cert_c, Qual))$ and $S'_{TCU}(S_c(S_a(Object)))$. Transfer is completed and acknowledged by transmitting $S'_{TCU}(S_c(S_a(Object)))$ to both $S_b$ & $S_c$.

It will be appreciated that in determining if the Qual is satisfied, the TCU may wait for an appropriate instruction or instructions, approval(s), or acknowledgment from $S_b$, e.g., that the necessary value has actually been received. This may be expressed as $S_b(S_c(S_a(Object)))$.

The rescission of an offer can be expressed symbolically as follows:

$S_b$ rescinds offer B to TCU $S_b(S_a(Object)), S_b(S'_{TCU}(S_b(S_a(Object))), Cert_b, Qual)$ and multiple offers B to C, D, etc. can be expressed symbolically as:

$S_b(S_a(Object)), S_b(S'_{TCU}(S_b(S_a(Object))), Cert_c, Cert_d, Qual)$ and counter offers C to B can be expressed as:

$S_c(S_b(S'_{TCU}(S_b(S_a(Object))), Cert_c, Qual), Counter Offer)$

The preceding example that has been presented in words and in symbols is just one of many specific applications of Applicants' inventions that each have their own particular advantages. It will be understood, for example, that transactions involving a plurality of strangers, e.g., a stranger-to-stranger-to-stranger transfer can easily be carried out by sequentially repeating the preceding example, once for each pair of strangers.

It will also be understood that the instructions can direct a transaction along many different paths and that instructions may come from a variety of entities, including the owner of an information object, an owner-designated custodian of an information object, or another agent. Instructions may be tiered by an electronic agent, which is generally understood to be a computer program or other automated process that can interpret instructions and act on them for a predictable end. Tiered instructions would have levels of response and decision making, such as if X (a second party) does not respond to an offer within a specified time period, then transmit the offer to Y (another second party), and if Y does not respond within another specified time period, then return the offer to the offeror (the first party).

For example, the instructions can permit a second party to accept some (or all) of a set of authenticated information objects, such as a set of titles to a fleet of vehicles, or to accept specified portions of one or more objects in the set. Applicants' inventions thus can provide asset- or risk-sharing or other forms of syndicated transactions; the instructions would permit other second parties to accept some or all of the remaining object or objects. This form of transaction might be useful in contexts, such as re-insurance, where it is desirable for one party, such as a primary insurer, to spread the cost or risk associated with an information object among several other parties, such as one or more re-insurers. Similarly, the instructions could permit a second party to "over-subscribe" to a first party's offer when the first party had one or more other "first parties" willing to provide the amount of the over-subscription. This form of transaction also might be useful in cost/risk management contexts like insurance, where a second party seeks to accept an object "greater" than the object offered by the first party.

As noted above, certified documents advantageously can be printed or otherwise reduced to "hard copy" and issued by the TCU in response to a suitable instruction. It is currently believed to be preferable for the TCU to apply to the hard copy some form of indicium or legend that is resistant to forgery or unauthorized imitation, such as a watermark, hologram, or similar, that would signify the TCU's "certification" of the document. This is one way in which a user could withdraw its records from the TCU, whether permanently or temporarily.

The following describes in more detail further aspects of these inventions, particularly methods involving counterparts, multiple executions, and combinations of these employing digital signatures without exposing exact renditions of transferable records, e.g., at an e-original client workstation EC. It will be appreciated that the moment when an e-original becomes a transferable record is determined by business rules, which is to say that the business rules govern whether the first, second, or n-th digital signature is required before the e-original achieves transferable record status. An issuer/owner employs the access controls and business rules to govern access to both "ordinary" e-originals and to e-originals that are or will be transferable records. Further, these methods and apparatus enable transfers of interests in e-originals that are also transferable records to be reliably conducted and evidenced. The evidence trail includes e-original versioning and audit records that establish the issuer/owner as the party to which the transferable record was issued or transferred.

Of course, the issuer/owner of an e-original must expressly agree to and use such business rules that establish with the TCU when the e-original becomes a transferable record. These business rules therefore determine the point in a deal, such as the execution of an agreement, when an e-original must be given the additional protections that may be required for care of a transferable record. Even so, these inventions can ensure that at no time does an unimpaired copy of a transferable record exist on a client workstation, unless specific provisions for such renditions are defined in the business rules, e.g., where an unimpaired copy is required for recordation or by regulation or legislation. It is believed that such exceptions to the protection of unimpaired copies may not be needed if recordation agents (e.g., county recorders) accept two-part renditions, i.e., discernable differences between what was signed and what is displayed, that are supported by these inventions.

The TCU controls a transferable record by enforcing business rules crafted by the corresponding e-original's owner to govern the creation, distribution, storage, retrieval, assignment, and deletion of transferable records. At no time should an authoritative copy that is a transferable record leave the custody of a TCU. Further, a non-removable indicium should be added, preferably to every page, of a rendition of an e-original that has achieved transferable record status that is displayed in whole or in part at a client workstation, unless an exception is necessary as described above. Such a non-removable indicium would clearly indicate that the rendition is a (impaired) copy of the transferable record.

Transferable records may be created in several ways. One way is simply to execute an information object prior to transmission to a TCU. On receipt and validation as an authentic electronic record, the TCU creates an e-original that is an authoritative copy and can apply business rules associated with handling a transferable record. Another way is to create and submit an information object to a TCU for subsequent execution, with submission using the above-described processes of creating e-originals so that versioning, audit, notifications, and one or more of the collaborative methods for deal or agreement execution can be employed.

Also in the following description, issuers/owners or their authorized agents are called "owners", and any participant, including an owner, having a defined role in the conduct of a deal, such as an agreement or transaction, is called a "user".

Except where expressly permitted, these inventions can ensure that an exact copy of a transferable record that might be mistaken for the transferable record itself never exists in any form at a client workstation. If an exception to this rule is permitted, special security provisions should be employed that guarantee that when a transferable record is returned to a TCU, its authenticity can be re-established by validating that the returned transferable record has not been altered. It will be appreciated that one aspect of such special security provisions can be employment of an additional wrapper or extended syntax to convey recordation details.

Figure 6:
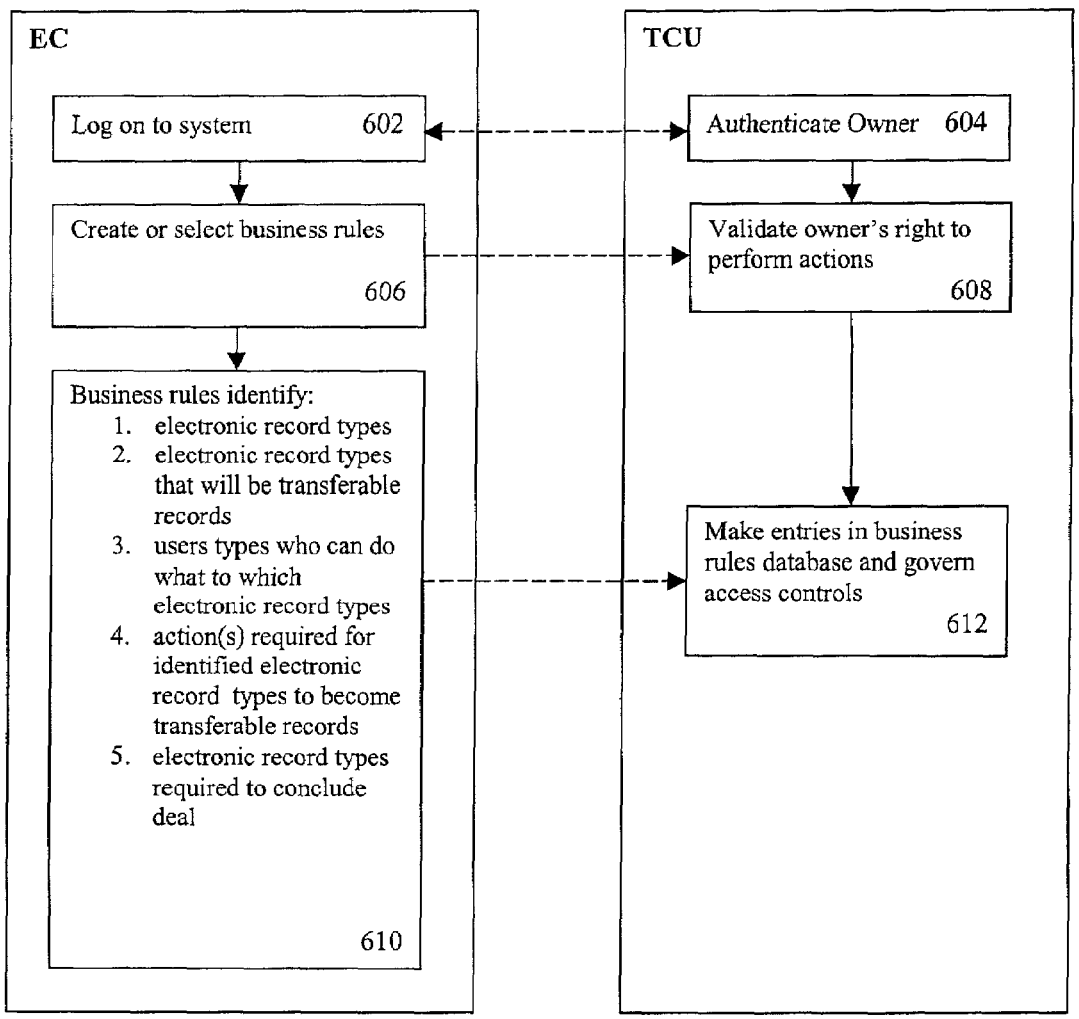
FIG. 6 illustrates owner definition of business rules relating to an agreement, deal, or transaction.

FIG. 6 illustrates a method of establishing business rules that govern deals, with emphasis on e-originals that are also transferable records. FIG. 6 shows how an owner may define business rules that implement business processes required for conducting a deal, and thus a TCU handles e-original objects based on the established rules. This set of actions advantageously creates a reusable set of rules templates, from which the owner can select the template that suitably matches the type of deal involved. The owner or authorized users can then populate the template with the actual information-object types needed for the conduct of the deal and thereafter. It is currently believed that the business rules having the most significance here relate to identification of those information-object or electronic-record types that are designated as transferable records.

In the method depicted in FIG. 6, the owner logs on to the system (block 602), i.e., accesses a TCU via an e-original client EC, and the TCU authenticates the owner's identity (block 604) as an authorized user of the system based, for example, on the owner's user ID and password. (In this and the following figures, communications between the client EC and the TCU are indicated by dashed lines and processing of information objects and other actions are indicated by solid lines.) The owner can then create or select business rules that taken together are templates that relate to desired types of deals (block 606), and such rules are communicated to the TCU, which validates the owner's roles and authorities, i.e., the owner's right to act with respect to the subject deal (block 608). It will be appreciated that the creation or selection of business rules and templates can advantageously be performed by owner interaction with an otherwise conventional deal setup and administration software application executed by the client EC. As indicated in block 610, a business rules template may typically identify (1) types of electronic records, (2) types of electronic records that will become transferable records, (3) users or types of user and what such users can do with respect to each electronic record type, (4) an action or actions necessary for transforming an electronic record (e-original) into a transferable record and for transferring an interest, such as ownership, in a transferable record, and (5) a set of electronic record types that are needed to conclude the respective deal. This information is saved by the TCU (block 612) in a database of business rules, which may be organized in subsets that govern respective owners and deals.

Business rules are preferably stored in a protected rules database. Users authenticate themselves to the system using a user ID and password. The rules database uses this log-on information to query the rules database to confirm the user's rights to perform requested actions, including establishing business rules for a deal or deals. The log-on information may be sufficient for a class of actions such as viewing or participating in and/or concluding low-value deals. Nevertheless, where additional assurances are required to perform requested actions, digital signature verification and authenticated user information conveyed in certificates can be added when querying the rules database. This layered approach to authenticating a user's identity and validating the user's rights, i.e., the user's set of authorized actions, may entail querying other databases based on the user or certificate attributes, such as role, value of transaction, and identification as owner or owner's agent and therefore as a user able to authorize the transfer of an interest, such as ownership, in a deal's e-originals.

Figure 7:
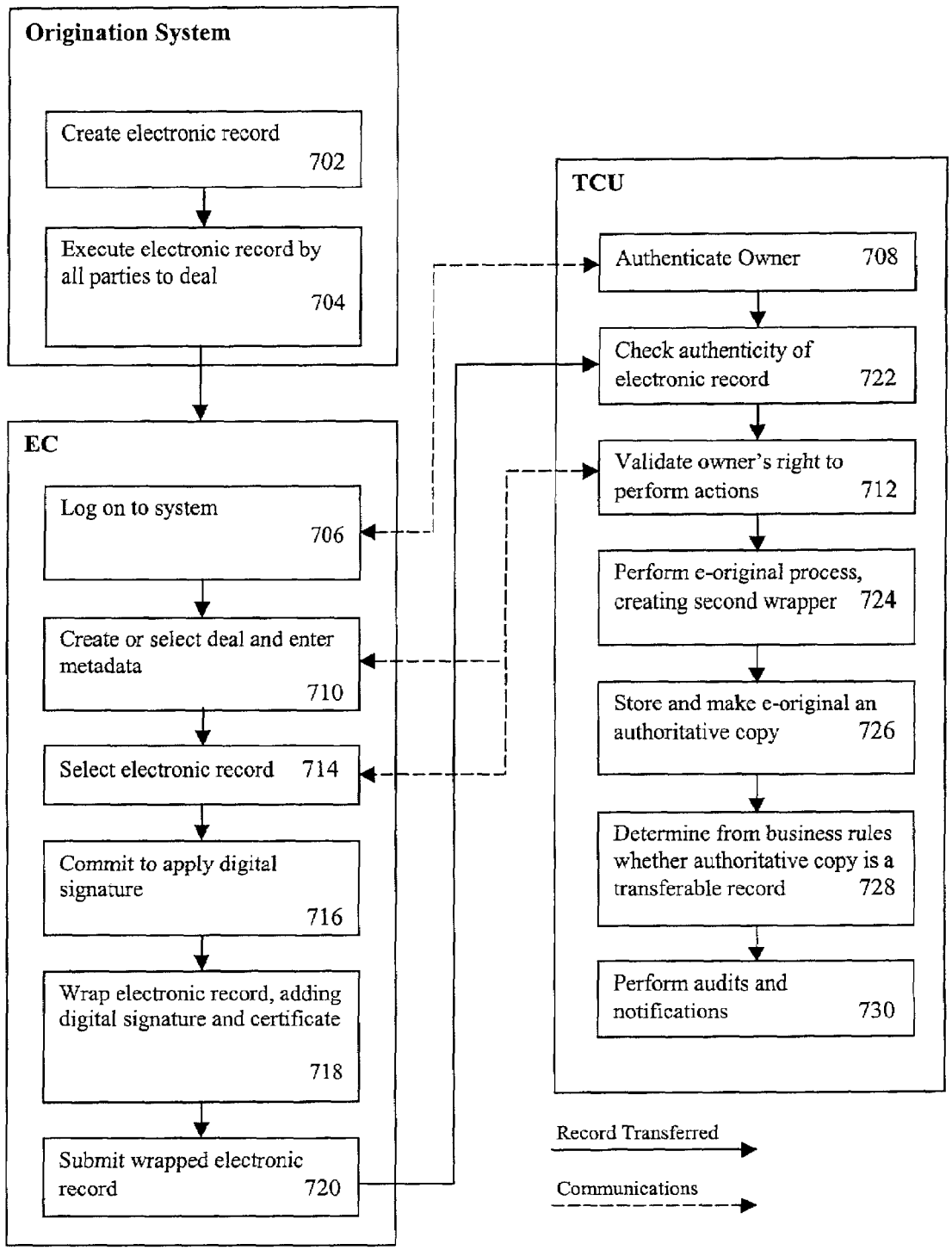
FIG. 7 depicts creation of electronic records and execution of a deal prior to submission to a TCU.

FIG. 7 depicts a method involving creation of electronic records and execution of a deal prior to submission of such information objects to a TCU. Such a transfer to a TCU of executed electronic records may be called "papering in" to the TCU. As described above, care should be taken to prevent exact copies of the executed electronic records from being printed or circulated.

As indicated by blocks 702, 704, one or more electronic records are created by an origination system, e.g., a word processor, and executed by parties to the respective deal, e.g., by applying holographic signatures to paper records that are converted to electronic information objects, for example by scanning. These electronic records are uploaded to an e-original client EC. Consistent with the aim of having a single authoritative copy in the possession of the TCU, the paper and electronic records are preferably either destroyed or suitably marked as a copies.

As in FIG. 6, the owner logs on to the system (block 706) via the e-original client EC, and the TCU authenticates the owner's identity (block 708). In block 710, the owner creates or selects a rules template that contains an appropriate set of record types (the owner may add and/or remove record types so that the required set of electronic record types corresponds to those required by the actual deal) and the owner enters pertinent metadata describing the deal by interacting with the deal setup and administration software application executed by the client EC. It will be understood that metadata are high-level summary data that describe a deal and can be used in querying the information objects making up a deal or deals, e.g., the who, what, where, when, and what for of the deal(s), the seller(s), buyer(s), agent(s), property description(s), sale price(s), sale terms, date(s) of sale, and for mortgages/leases the type(s), interest rate(s), period(s), and conditions such as pre-payment penalty. A query of such metadata might seek a list of deal closings on a particular date or during a period of time and/or at a particular interest rate. It will be understood that metadata are analogous to the metatags that are associated with World Wide Web pages and that are used by Internet search engines in searching for information.

Rules selected or created by the owner are communicated to the TCU, which validates the owner's roles and authorities, i.e., the owner's right to act with respect to the subject deal (block 712). The owner then selects electronic records (block 714) locally in the client EC, which are communicated to and assigned to corresponding record types at the TCU, which checks the owner's right to access selected record type (block 712). After selecting an electronic record and reviewing its contents, the owner commits to apply the owner's digital signature (block 716). In particular, the owner may be asked to affirm, by an overt act, the owner's decision to be bound by the owner's digital signature, after which the client EC computes the owner's digital signature and creates (block 718) a wrapper that includes at least the content of the record and the owner's digital signature and certificate. The wrapped electronic record is then submitted to the TCU (block 720).

The TCU checks the integrity of the contents of the submitted wrapped record (block 722), and the TCU preferably re-validates the owner's right to add the particular record type (block 712) and re-confirms the owner as still a valid TCU user (block 708). If this validation and confirmation is successful, the TCU applies (block 724) a second wrapper that includes the current date and time and the TCU's digital signature and certificate, i.e., the TCU transforms the record into an e-original object. The date and time represent the moment that an e-original is created and the TCU's assumption of control. The e-original is stored as an authoritative copy (block 726), and if the submission replaces an existing e-original, then the new version supersedes the prior version and is made the authoritative copy.

The TCU checks (block 728) the applicable business rules to determine whether the record type of the authoritative copy is classified as a transferable record. If so, the TCU performs actions established in the business rules for handling transferable records. For example (block 730), the TCU at least performs audits appropriate to handling transferable records and notifies those users designated in the deal setup of the audit results. These steps are repeated for every deal and corresponding record in order to minimize the potential for fraud during execution of electronic records prior to delivery of the records to the TCU.

Figure 8:
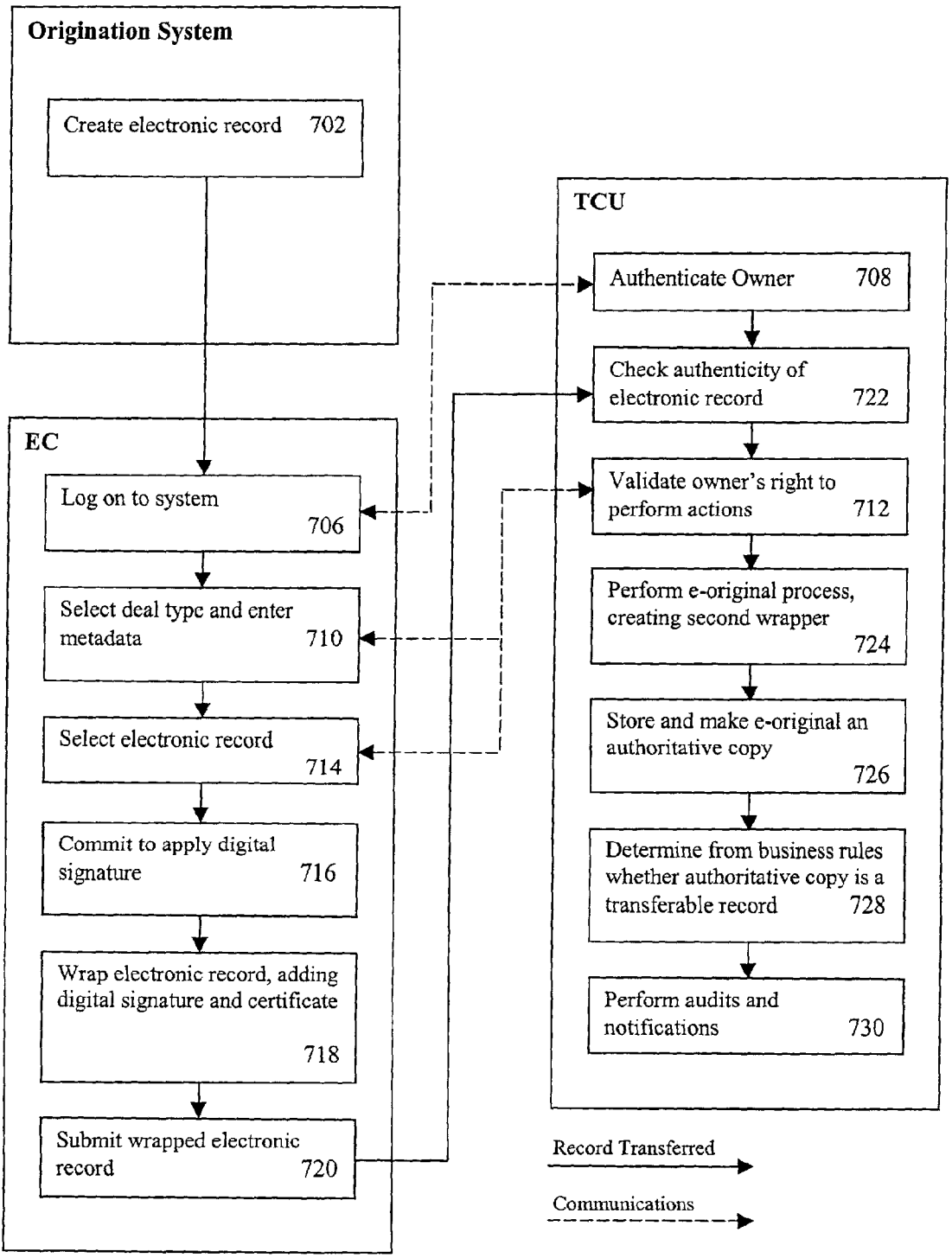
FIG. 8 depicts creation of e-originals at a TCU prior to execution of a deal.

FIG. 8 depicts a method involving creation of unexecuted electronic records and submission of such information objects to a TCU. Such a transfer to a TCU may also be called the equivalent of "papering in" to the TCU, and thus the method depicted in FIG. 8 includes many of the same steps as the method depicted in FIG. 7. Accordingly, blocks shown in FIG. 8 that correspond to blocks shown in FIG. 7 are identified by the same reference numbers as the blocks in FIG. 7.

A difference between the methods depicted in FIG. 7 and FIG. 8 is that in FIG. 8, one or more electronic records created by the origination system are not executed by parties to the respective deal. These unexecuted electronic records are uploaded to an e-original client EC. Since the records are unexecuted and thus cannot be mistaken for executed records, it is not necessary to destroy or mark them as copies. These records may, however, contain deal information and the names of participants.

Figure 9:
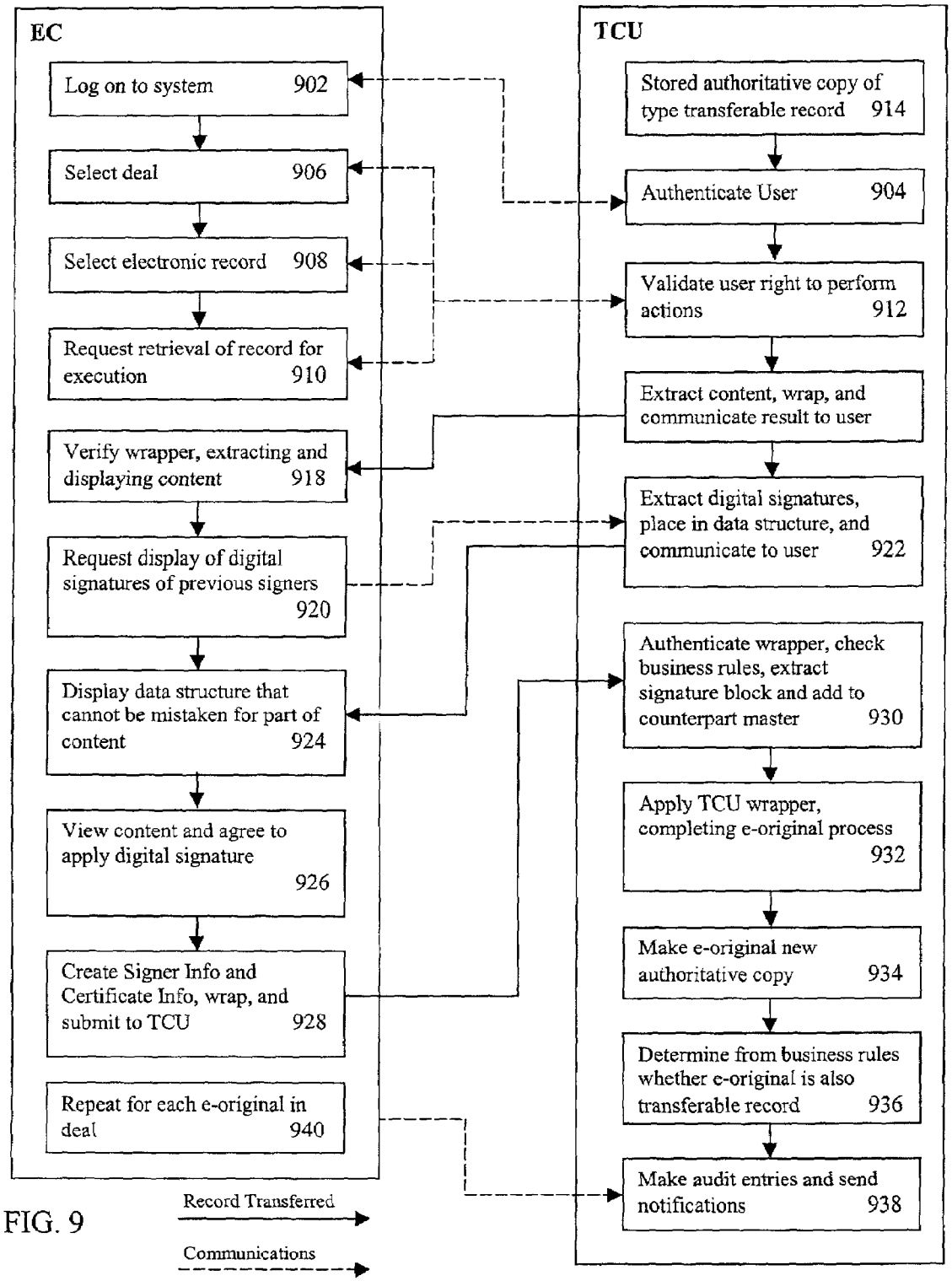
FIG. 9 depicts execution of e-originals with a TCU's ensuring that exact copies of partially executed e-originals do not exist outside the TCU.

FIG. 9 depicts a method involving execution of e-original objects that are held by a TCU such that the TCU ensures that an exact copy of a partially executed e-original, especially a transferable record, does not exist outside the TCU.

As described above, a user logs on to a TCU, which authenticates the user's identity, roles, and authorities (blocks 902, 904). The user selects an existing deal, e.g., by entering a unique number that identifies the deal or elements of the deal's metadata (block 906). If more than one deal meets the selection criteria, the user may be asked to select one or re-specify (refine) the selection criteria until the desired deal is located and selected. Once the desired deal is selected, the user may be shown a list of record types that exist in the deal so that the user can select the record type of the record to be executed (block 908) and request retrieval of that record (block 910). The TCU validates the user's rights to make such selections and request (block 912). If validated by the TCU, the TCU retrieves the respective e-original from storage (block 914), extracts and creates a copy of its contents, to which TCU appends at least a current date and time and affixes the TCU's digital signature and certificate, and wraps the result (block 916). It will be understood that the TCU "wraps" the result by creating a wrapper such as those described above. The TCU then communicates the wrapped result to the client EC and user.

The client EC uses the wrapper to validate its origination at the TCU and the non-alteration (integrity) of its content during communication, and the client EC may display or otherwise render the content for the user (block 918). The user may request display or other rendering of previously applied digital signatures (block 920), and in response to such a request, the TCU extracts the digital signatures from the e-original and inserts the respective signer information (names and dates) into a data structure that is described further below. The TCU places the data structure in a wrapper that enables the user to verify its origination at the TCU and communicates the wrapper to the client EC and user (block 922).

The data structure that includes the signer information and that is created by the TCU is such that upon display or rendering by the client EC, the signer information cannot be mistaken as a part of the displayed record content (block 924). In particular, printing the stored or displayed record should result in only a rendition of an unexecuted record. Such data structures typically contain the parsed contents of one or more signature blocks, and not every data element is usually incorporated from any signature block. What is displayed is advantageously a subset that enables a user to "drill down" further if needed or if the user is allowed. Tags, where available, may be included to match included signer info to signature fields in a data object, which enables checks to appear where signatures were previously applied or pop-up windows to be positioned. Application-specific business rules determine what is returned in a data structure and how what is returned is used. Possible elements of a data structure are a signer's DN and issuer information derived (although not normally) from cert info, contents of an authenticated attribute (e.g., a holographic signature), ranking of the signature, and placement tags. The rank indicates in which wrapper the signature is found, which typically indicates whether the signature is a co-sign or counter-sign.

If the user elects to apply/commit its digital signature (block 926), the client EC preferably displays a message indicating that its digital signature will be applied to an exact rendition of the e-original held at the TCU, not the e-original itself to which the user's digital signature will be added. If not apparent from viewing the document, the applicable business rules should provide that the user is informed that they are co-signing or counter-signing (as the case may be) the e-original. In any event, the user is asked to affirm the action (block 926) as described above.

If the user affirms, the client EC generates a hash of the record contents and a wrapper that includes the user's signature block, and the client EC submits the wrapper to the TCU (block 928). As described in more detail below, the user's signature block includes signer information (hash of content, authenticated attributes, signer's digital signature, and unauthenticated attributes) and certificate information (signer's authentication certificate and possibly CA-issued additions attributes, which may take the form of a certificate). Uses of attribute fields and certificates are described above. It will be appreciated that more than one user (signer) may be present at the client EC and each may create their own signature blocks that are included in the wrapper submitted to the TCU.

After receiving the wrapper submitted by the client EC, the TCU validates the authenticity of the wrapper, comparing the hash of the e-original content with the content hash contained in the signature block(s), and the rights and participation of the signer(s) (block 930). In general, the TCU extracts the signature block(s) from the submitted wrapper, retrieves the e-original from which it previously extracted content (see block 916), and adds the signature block(s) to the retrieved e-original, forming an updated record. Placement of the signature block(s) is preferably determined by the business rules. The signature block(s) may be placed in any of the recursive wrappers or in an object-inventory. This flexible placement capability enables the initial e-original to be retained in unaltered form.

Since many users may need to digitally sign a document to conclude a deal and since such signatures may occur at different times, the TCU may wait until it receives all of the signature blocks of the users (e.g., co-signers, counter-signers, etc.) that are required to complete a level of the deal before finally creating a new (final) e-original that includes a date/time stamp and the TCU's digital signature and certificate (block 932). Alternatively, the TCU may create a new e-original with each new signature block submission. The date/time that the TCU receives each signature block may be recorded in the unauthenticated attribute field of that submitter's signature block. The TCU's creation of its own signature block, which must contain the date and time, can be used to indicate the date/time that the new e-original is made the authoritative copy (block 934) and, as determined by the applicable business rules, a transferable record (block 936), with the appropriate audit entries and notifications (block 938) as described above. It wll be understood that these steps are carried out for each deal and corresponding records (block 940).

Figure 10:
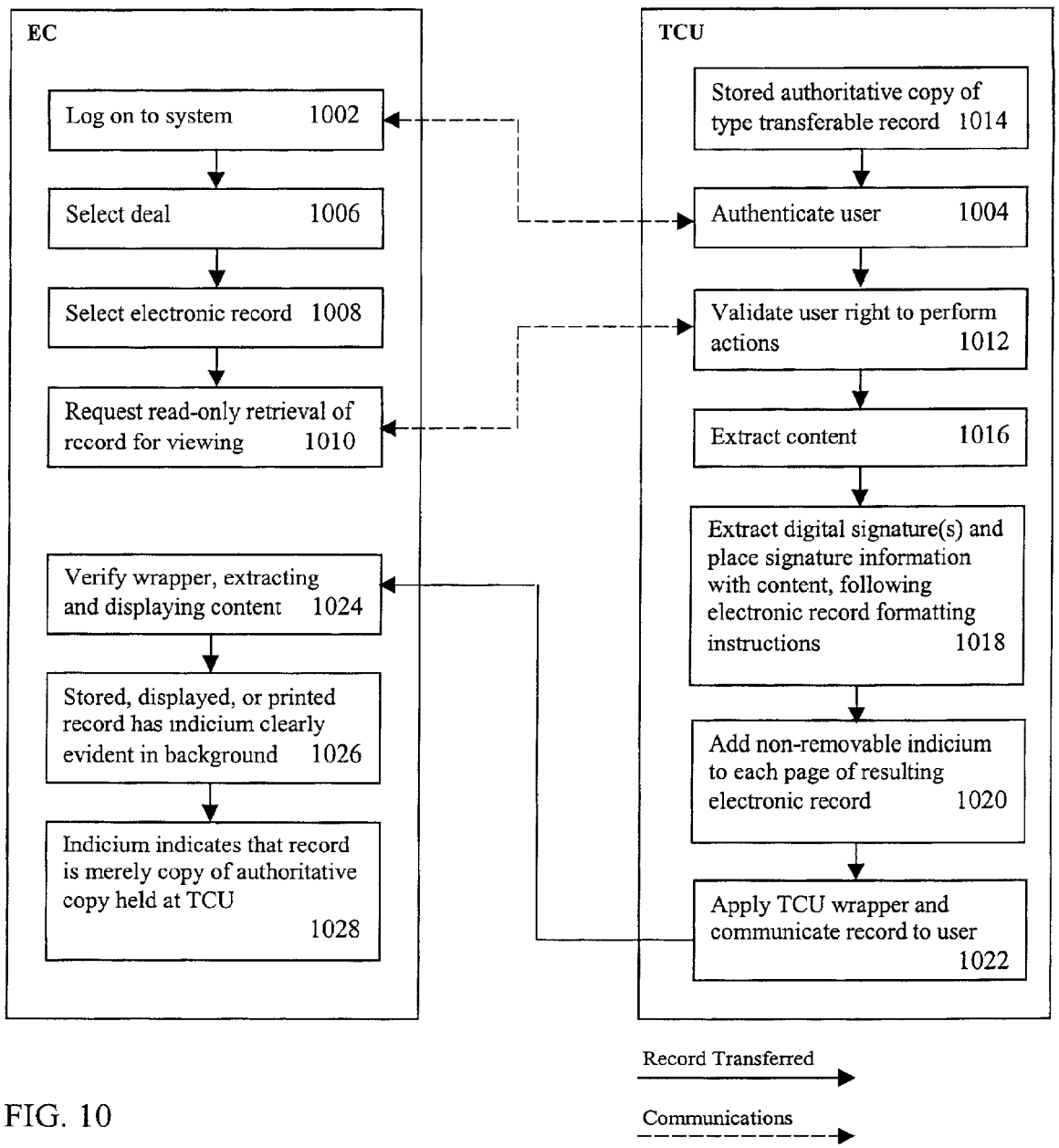
FIG. 10 describes creation of a copy of a transferable record.

FIG. 10 depicts a method involving the creation of a copy of an e-original that is a transferable record to which at least one non-removable indicium is added that clearly identifies the information object as a copy no matter how it is stored or rendered. It will be appreciated that such an e-original complies with the requirements of recent and pending legislation relating to electronic signatures.

As described above in connection with previous figures, a user logs on to a TCU, which authenticates the user's identity, roles, and authorities (blocks 1002, 1004). As described above, the user selects an existing deal using criteria that identify the deal or elements of the deal's metadata (block 1006). Once the deal is selected, the user may be shown a list of record types that exist in the deal, from which the user selects a record type to be displayed (block 1008). The user requests retrieval of that record for read-only access (block 1010), which may be the only access rights granted to some users. The TCU validates the user's rights to make such selections and request (block 1012). If validated by the TCU, the TCU retrieves the respective e-original from storage (block 1014) and extracts the contents of the retrieved e-original (block 1016).

The TCU also preferably extracts the signer information and the date/time that the digital signature was applied (block 1018). If available, e.g., from the retrieved e-original, record formatting information associated with the retrieved e-original is used by the TCU to guide its placement of the signer information within the electronic record. If such associated record formatting information is not available, the TCU places the signer information according to the applicable business rules or a general set of business rules. For example, a cursor displayed by the client EC is positioned over the field indicating where a user's digital signature or holographic signature is to be placed. This positioning can be performed manually or by the client EC if appropriate tags are incorporated in the object. In general, the recorded position or tag is used for placement, for example on the equivalent of an appended paper signature page. Alternatively, a relative position can be determined based on placement in the respective wrappers, and translated by business rules into position relative to the object.

The TCU also adds a non-removable indicium to the record, preferably on each page, indicating that the record is merely a copy (block 1020). Such an indicium advantageously may appear in the background of the record when it is rendered on an electronic display, such as a computer monitor, and may be more visually prominent when the record is rendered on a printer. The applicable business rules may further specify that the indicium include a legend identifying the TCU where the e-original (authoritative copy) is held, e.g., by naming the TCU and specifying its location.

The TCU wraps the record with indicium, appended current date and time and its affixed digital signature and certificate (block 1022), and communicates the wrapper to the client EC and user. The wrapper is used by the client EC to validate its origination at the TCU and the non-alteration of its contents during communication, and the client EC extracts and renders the record in a suitable manner (block 1024). The record may be stored or displayed, printed, or otherwise rendered (block 1026), but the indicium ensures that the record cannot be mistaken for anything but a copy (block 1028).

Figure 11:
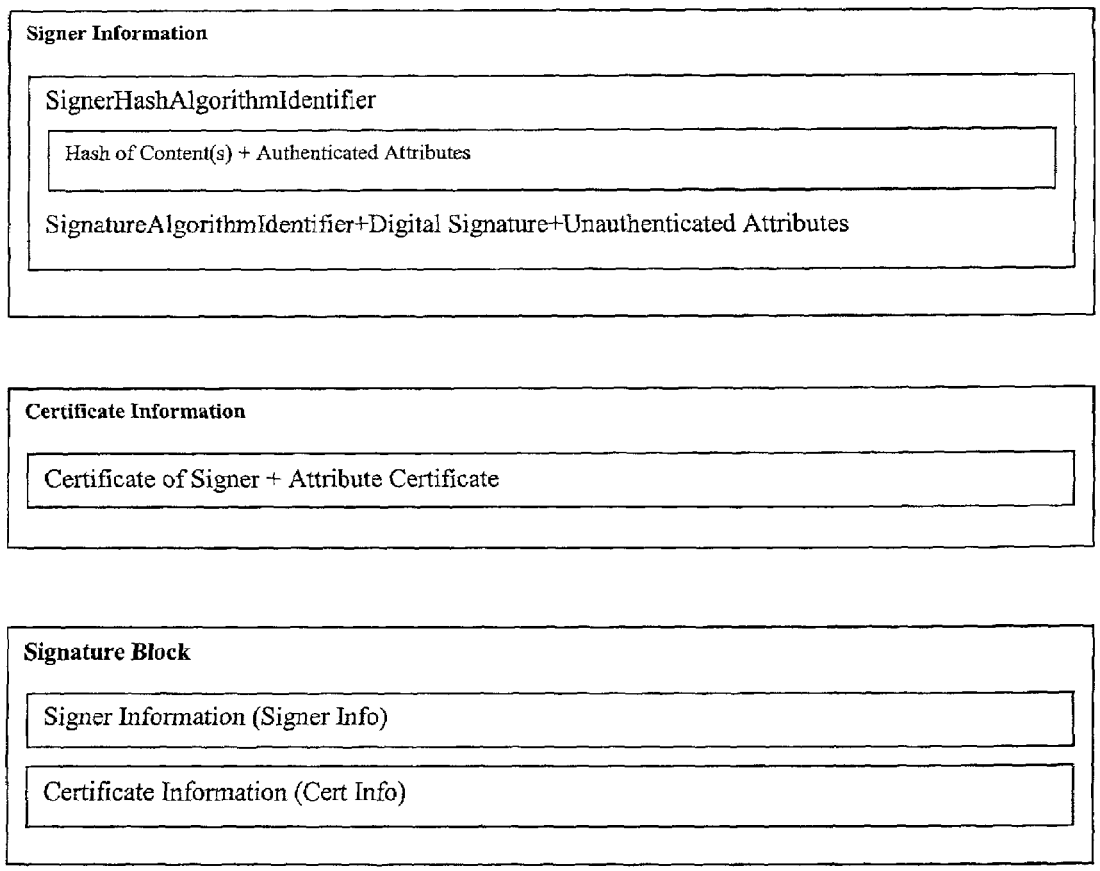
FIG. 11 depicts a signature block.

It will be appreciated that the methods and apparatus described above involve the use of signature blocks and wrappers. FIG. 11 depicts an exemplary composition of a signature block, which typically includes at least two elements, or data structures: signer information and certificate information. These elements may be called signer info and cert info in shorthand. Signer information is generated by first hashing the content(s) of the record(s) to which the signer is applying its digital signature. Attributes that will be protected by the digital signature, i.e., attributes that are used in computing the digital signature, are then appended to the hash, and such attributes can therefore be called "authenticated attributes" that reside in an authenticated attribute field of the signer information.

In general, authenticated attributes are used for defining the signer or the signer's actions. Authenticated attributes may include, but are not limited to, the date and time of the digital signing, the reason for signing, and the signer's holographic signature, either freshly or previously digitized. It is currently preferred that this nature of the holographic signature, where used, be included in the authenticated attributes. It will be appreciated that the association of the signer's digital signature and holographic signature and their placement in the record, where available, may also be included in the authenticated attributes, for example, by indicating a physical location in the record or by a information field, such as a tag field, included in the record.

The content(s) hash and the authenticated attributes are depicted in FIG. 11 as an inner data structure that is used in computing the signer's digital signature, which is depicted in FIG. 11 as part of an outer data structure that also includes other information elements. Those other information elements preferably include an identifier of the hash algorithm used by the signer, an identifier of the digital signature algorithm used by the signer, and advantageously an unauthenticated attribute field, which is "unauthenticated" with respect to the signer since that field is not used in computing the signer's digital signature. The unauthenticated attribute field may be used for information that needs to be conveyed to the TCU and may later be used by the TCU to record various data, such as the time it received a signature block. It should be understood that the authenticated and unauthenticated attribute fields are optional, and it will be appreciated that a user's signature block eventually is protected by the TCU's signature placed in an outermost wrapper.

For deals and records involving multiple parallel digital signatures, each digital signature would be computed over the hash of the content(s) and the authenticated attributes with respect to that digital signature. The content hash would stay the same, but the authenticated attributes could vary from digital signature to digital signature, thereby enabling specific information concerning each act of signing to be conveyed.

The certificate information in a signature block typically includes at least an authentication certificate (e.g., an X.509 certificate) and may include one or more other data structures containing additional information about the signer. Such additional information would typically be issued by an authority recognized by the TCU and document authentication system and may be arranged in a data structure having the form of a certificate digitally signed by the issuing authority.

Figure 12:
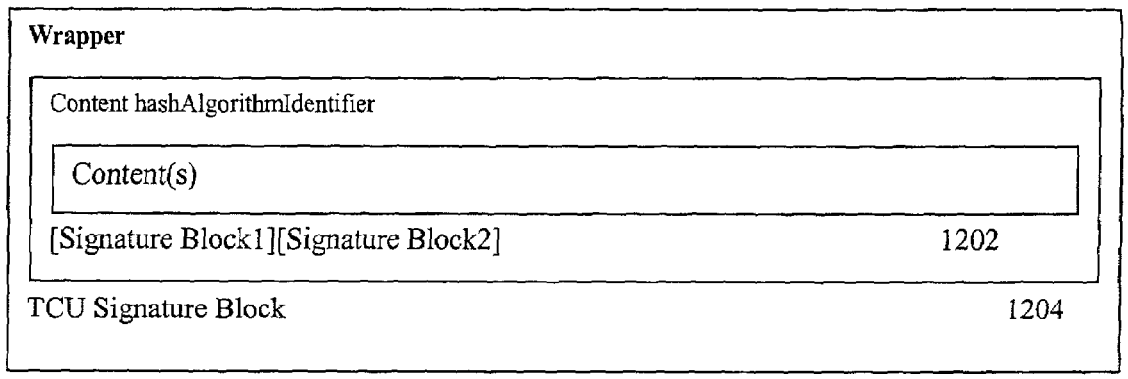
FIG. 12 depicts multiple parallel signatures applied to an inner wrapper and a TCU's digital signature applied to an outer wrapper.

FIG. 12 depicts exemplary wrappers, showing an inner wrapper 1202 and an outer wrapper 1204. A wrapper is a data structure containing tags that permit locating and extracting information fields contained in the wrapper, and thus any record format supporting inclusion of digital signatures with content may be used, including, but not limited to, PKCS#7, S/MIME, XML, XFDL, HTML, and XHTML. Information elements that may be contained in all wrappers are algorithm identifiers, key size for each algorithm, content, user signature blocks, and TCU signature block. As depicted in FIG. 12, the inner wrapper 1202 includes multiple parallel digital signatures, depicted by signature block 1 and signature block 2, and the outer wrapper includes a TCU's digital signature block. Although only single algorithm-identifiers are shown, it should be understood that each signature may use a different combination of algorithms and key sizes. This would be shown as inclusion of identifiers that would align one for one with the signature blocks (i.e., first, second, third, etc.). Alternatively, the algorithm information may be conveyed in a user's certificate info.

Figure 13:
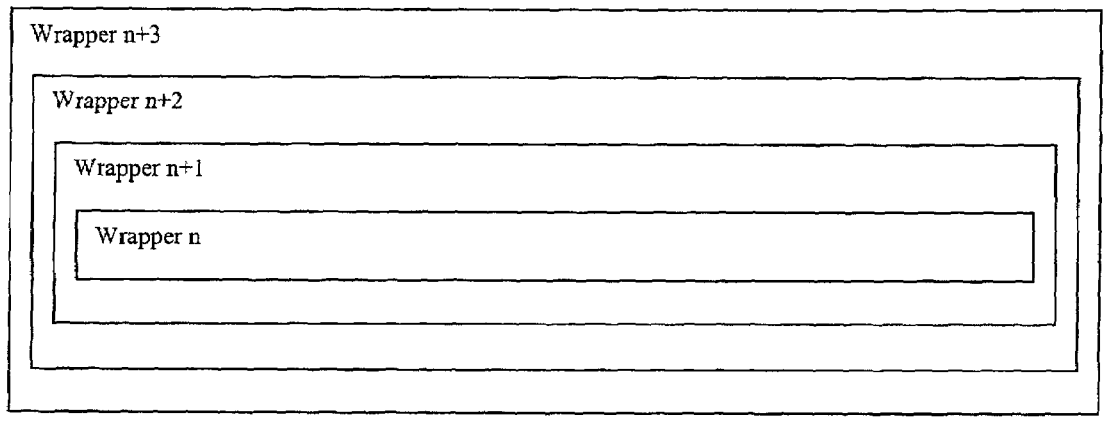
FIG. 13 depicts recursive application of wrappers.

As suggested by FIG. 12, it will be appreciated that wrappers can be applied recursively, which simply means that wrappers can be contained within wrappers and an example of which is depicted in FIG. 13. It will be recognized that this example is an implementation of the signature chaining method described above. Single or multiple parallel signature blocks may be applied at any wrapper level n, n+1, n+2, n+3, etc. An inner wrapper, i.e., a wrapper that is contained within at least one other wrapper, may contain a preserved e-original record, with that wrapper's outer wrappers containing single or parallel signature blocks. Since the outermost wrapper (wrapper n+3 in FIG. 13) typically includes the digital signature of a TCU, validating the TCU's digital signature, which was computed over the cumulative contents of all wrappers, is sufficient to detect any alteration, even one bit, of the protected contents. FIG. 13 depicts four level of recursion, but it will be appreciated that there is no physical limit to the number of wrappers that may be applied. There may, however, be a practical limit due to the computation power available, the time it takes to unwrap and parse each data structure, and the business responsiveness demanded by users. Wrapper recursion may also be dictated by business processes such as those involving the signature-chaining method described above. It will be understood that wrappers can include serial as well as parallel digital signatures, which can be those of users or Transfer Agents, depending on the business process implemented.

Figure 14:
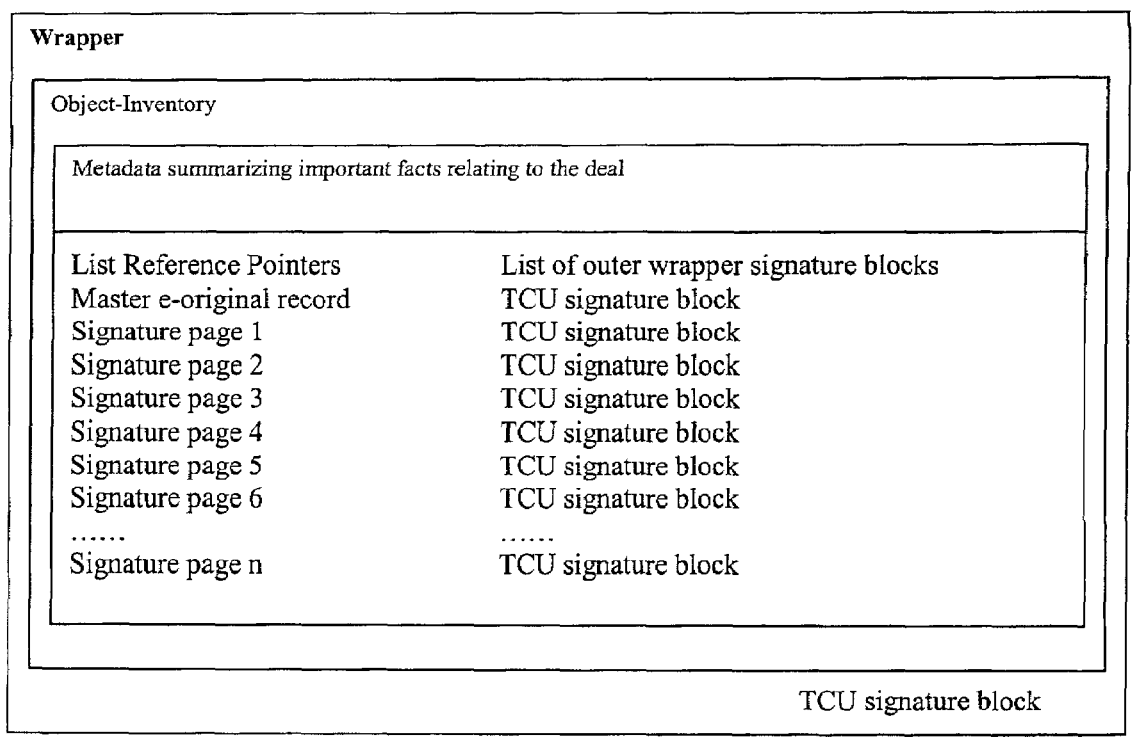
FIG. 14 shows use of the object-inventory method to implement counterpart execution of a deal.

FIG. 14 depicts an example of a wrapper that might arise from the above-described object-inventory method using counterpart signatures. It will be appreciated that such a method is the equivalent of traditional counterpart execution of a deal, such as an agreement. In the course of the method, a master copy of an e-original record and a signature page are made available to each participant in the deal, and each participant adds its digitized signature to its respective signature page and returns its signed signature page or both the master copy and its signed signature page to the TCU. Each participant's signature block thus contains a hash of the combination of the master copy and that participant's signature page. Only one copy of the master record must be preserved, preferably as an e-original object, but the signature page of each participant must be preserved, also preferably as e-original objects. As described above, the object-inventory method links the master agreement to all signature pages, acting much like a paper clip or staple on a paper document in that it cryptographically binds all of the records represented by it.

It will be appreciated that in accordance with the object-inventory method, the e-originals pertaining to a deal are maintained separately. The object-inventory itself is an e-original that includes metadata that are details characterizing the deal and selection criteria used to locate the deal in the system and that includes one or more database references used for retrieving the individual e-originals pertaining to the deal and the TCU's signature block in each e-original. As an e-original itself, the object-inventory is a wrapper that includes the TCU's signature block. A new version of the object-inventory is created at the conclusion of a business step or deal status change.

It will be understood that after its digital signature is applied to an authoritative copy, a TCU typically adds one or more indicia into copies of the authoritative copy that are provided to authorized users such that when a copy is displayed, printed, or otherwise rendered, it is clearly evident that the rendition is a copy of the authoritative copy, which is retained by the TCU. Thus, the protections required by recent and pending legislation relating to electronic signatures are provided. Nevertheless, it will be appreciated that these protections are not available when a TCU is not involved during execution of a deal, as in FIG. 7, and thus, it is not possible to guard against a copy of a transferable record being rendered in a manner such that the copy could be mistaken for the actual transferable record. Whether intentionally or unintentionally, such rendering would create the possibility of fraud.

It will be noted that this description and the drawings are illustrative only and that one of ordinary skill in the art would recognize that various modifications can be made without departing from the essence of these inventions, which is defined by the following claims.

What is claimed is:

1. A computer implemented method of handling stored authoritative copy objects that have been created by signing information objects by respective transfer agents, submitting signed information objects to a trusted third-party repository of information objects, validating the submitted signed information objects by at least testing the integrity of the contents of each signed information object and the validity of the signature of the respective transfer agent, and applying a wrapper to each validated information object including a current date-time stamp and a digital signature and authentication certificate of the trusted third-party repository of information objects, which handles at least one authoritative copy object based on rules established by an owner of the at least one authoritative copy object, comprising the steps of:
   establishing at least one type of information object as an authoritative copy object that is not to be released by a trusted third-party repository of information objects;
   enabling at least one selected user to access at least one selected type of authoritative copy object;
   identifying at least one type of authoritative copy object required to conclude a deal; and
   identifying and controlling at least one selected authoritative copy object as a transferable record.

2. The method of claim 1, wherein based on rules established by an owner of an authoritative copy object requiring execution as part of concluding the deal, the trusted third-party repository of information objects notifies at least one participant in the deal when the authoritative copy object is received by the trusted third-party repository of information objects.

3. The method of claim 1, further comprising the step of creating an object-inventory from at least one stored authoritative object that is a transferable record and is required to conclude the deal, wherein the object-inventory includes a current date-time stamp and a digital signature and authentication certificate of the trusted third-party repository of information objects, and the object-inventory comprises a wrapper that includes object identifiers that respectively point to the transferable record and at least one signature block of at least one participant in the deal, the at least one participant's signature block comprising a hash of a combination of a master copy of the transferable record and the at least one participant's digitized signature.

4. The method of claim 3, wherein the object-inventory further includes metadata summarizing the deal.

5. The method of claim 3, wherein in addition to the one stored authoritative copy object, at least one wrapped signature block is included in the object inventory, the object inventory and information objects referenced therein being treated by the trusted third-party repository of information objects as an authoritative copy.

6. The method of claim 3, wherein in addition to the one stored authoritative copy object, at least one counterpart signature page is included in the object inventory, the object inventory and information objects referenced therein being treated by the trusted third-party repository of information objects as an authoritative copy.

7. The method of claim 1, further comprising the steps of:
   receiving, by the trusted third-party repository of information objects, a request from a user to retrieve content of an authoritative copy object; and
   checking owner-established rules associated with the type of the authoritative copy object identified in the request to determine whether the user has been enabled to access the type of authoritative copy object identified in the request.

8. The method of claim 7, wherein the request indicates that the content is to be retrieved to add at least one signature, and if the user has been enabled to access the type of the authoritative copy object identified in the request, the trusted third-party repository of information objects carries out the steps of:

stripping all signatures from the authoritative copy object identified in the request, thereby leaving only the content of the authoritative copy object;

forming a wrapper that includes the content of the authoritative copy object identified in the request, a current date-time indication, and the trusted third-party repository of information objects' digital signature and authentication certificate, and communicating the wrapper to the user.

9. The method of claim 8, wherein the user receives the wrapper and extracts the content for rendering by the user.

10. The method of claim 9, wherein the user prints the content.

11. The method of claim 9, wherein the user queries the trusted third-party repository of information objects for parties who may have signed the authoritative copy object corresponding to the content rendered by the user, and in response to the query, the trusted third-party repository of information objects unwraps the authoritative copy object, extracts any signer information included in the authoritative copy object, forms a data structure comprising the signer information, and communicates the data structure to the user.

12. The method of claim 11, wherein a signed-by designation, distinct from a signer's mark, is associated with a represented signer information.

13. The method of claim 9, wherein after rendering the content, a user forms a respective signature block from the content and the user's digital signature, commits to be bound by its digital signature, and submits the signature block to the trusted third-party repository of information objects.

14. The method of claim 13, wherein the user's signature block comprises signer information that includes at least a hash of the content and the user's digital signature and certificate information.

15. The method of claim 14, wherein the signer information includes at least one authenticated attribute.

16. The method of claim 13, wherein a plurality of users submit respective signature blocks in parallel to the trusted third-party repository of information objects.

17. The method of claim 16, wherein the signature blocks are stored by the trusted third-party repository of information objects as recursively applied wrappers.

18. The method of claim 13, wherein the trusted third-party repository of information objects extracts information from the signature block submitted by the user and, based on the extracted information, verifies an identity of the user and an integrity of the content used to form the signature block.

19. The method of claim 18, wherein the trusted third-party repository of information objects verifies the integrity of content by computing a hash of the content and comparing the computed hash to a hash included in a signer information portion of the signature block.

20. The method of claim 13, wherein after the signature block is submitted to the trusted third-party repository of information objects, the trusted third-party repository of information objects retrieves the corresponding authoritative copy object, unwraps the authoritative copy object to retrieve the content of the authoritative copy object, and forms a wrapper that includes the retrieved content, the submitted signature block, a current date-time indication and the trusted third-party repository of information objects' digital signature and authentication certificate, whereby the wrapper comprises a new authoritative copy object.

21. The method of claim 20, wherein the user's signature block includes an unauthenticated attribute field, and the trusted third-party repository of information objects adds the current date-time indication to the unauthenticated attribute field to indicate a time of receipt by the trusted third-party repository of information objects of the user's signature block.

22. The method of claim 20, wherein a plurality of users submit respective signature blocks to the trusted third-party repository of information objects, and the submitted signature blocks are placed in at least one of a plurality of recursively applied wrappers.

23. The method of claim 20, wherein the trusted third-party repository of information objects notifies the owner of the authoritative copy object corresponding to the content, based on a rule established by the owner, that the signature block has been included in the wrapper.

24. The method of claim 23, wherein the new authoritative copy object is a transferable record based on the established rules.

25. The method of claim 23, further comprising the steps of:

forwarding a rendering of the authoritative copy object to a designated agency or government entity for recordation;

retrieving or receiving a recorded authoritative copy object;

forming a different wrapper that includes the recorded authoritative copy object, a current date-time indication, the trusted third-party repository of information objects' digital signature and authentication certificate;

governing the storing, versioning and managing of a new authoritative copy object; and notifying the owner of the completion of the steps.

26. The method of claim 25, further comprising recording of the authoritative copy object by a designated agency or government entity.

27. The method of claim 1, wherein at least one type of authoritative copy object is established as potential transferable records.

28. The method of claim 1, wherein one or more users are authorized by the owner of at least one authoritative copy object to communicate an instruction to a first trusted third-party repository of information objects to transfer at least one identified authoritative copy object to a specified second trusted third-party repository of information objects comprising the steps of:

transferring from a first trusted third-party repository of information objects to a second trusted third-party repository of information objects at least one authoritative copy object;

receiving, receipting and controlling by a second trusted third-party repository of information objects of at least one authoritative copy on verification of successful transfer; and impairing, removing or altering by a first trusted third-party repository of information objects of the non transferred authoritative copy object, as per instruction or established rules by the owner or owner's agent, upon receipt of acknowledgement of successful transfer of an authoritative copy object from a second trusted third-party repository of information objects.

29. The method of claim 28, wherein the transfer of at least one authoritative copy object from a first trusted third-party repository of information objects to a second trusted third-party repository of information objects comprising the steps of:

creation by a first trusted third-party repository of information objects of an object inventory that contains a list of at least authoritative copy object and other information objects to be transferred;

transfer by a first trusted third-party repository of information objects to a second trusted third-party repository of information objects at least one object inventory, information object and authoritative copy;

receiving, validating, storing and controlling by the second trusted third-party repository of information objects at least one object inventory, information object and authoritative copy;

using the object inventory by a second trusted third-party repository of information objects to ensure that all information objects are transferred;

creating a receipt by a second trusted third-party repository of information objects by applying to the object inventory a current date-time stamp and a digital signature and authentication certificate of a second trusted third-party repository of information objects;

sending the receipt created by a second trusted third-party repository of information objects to a first trusted third-party repository of information objects.

30. The method of claim 28, wherein a second trusted third-party repository of information objects applies to transferred authoritative copy objects a current date-time stamp and a digital signature and authentication certificate of the second trusted third-party repository of information objects and stores and assumes control of these information objects as per owner instructions.

31. A computer implemented method of handling stored authoritative copy objects that have been created by signing information objects by respective transfer agents, submitting signed information objects to a trusted third-party repository of information objects, validating the submitted signed information objects by at least testing the integrity of the contents of each signed information object and the validity of the signature of the respective transfer agent, and applying a wrapper to each validated information object including a current date-time stamp and a digital signature and authentication certificate of the trusted third-party repository of information objects, comprising the following steps by the trusted third-party repository of information objects:

receiving a request submitted by a user for retrieval of an authoritative copy object identified in the request;
  determining whether the user has authority to submit the request; and
  if the user is determined to have authority, carrying out the steps of:
    retrieving the authoritative copy object identified in the request;
    extracting from the retrieved authoritative copy object content information and at least one signature block;
    extracting from the signature block signer information;
    extracting at least one of a current date-time of a digitized signature included in the signer information and a current date-time of the trusted third-party repository of information objects' receipt of the signature block;
    extracting from the signature block certificate information that includes signer identifying information;
    forming a data structure from the extracted information such that upon rendering the content the information is properly placed with respect to the content and includes at least one forgery-resistant indicium that clearly identifies the rendered information as a copy; and
    communicating the data structure to the user, the data structure communicated to the user representing an impaired version distinct from the unique authoritative storage copy that is not to be released by the trusted third-party repository of information objects.

32. The method of claim 31, wherein the data structure is included in a wrapper that also includes a current date-time indication and the trusted third-party repository of information objects' digital signature and authentication certificate.

33. The method of claim 31, wherein the data structure includes tags that guide placement of the information.

34. The method of claim 33, wherein a tag-based image file format is created that is clearly marked as a copy of an authoritative copy that is still held at the trusted third-party repository of information objects.

35. A computer implemented method of handling stored authoritative copy objects that have been created by signing information objects by respective transfer agents, submitting signed information objects to a trusted third-party repository of information objects, validating the submitted signed information objects by at least testing the integrity of the contents of each signed information object and the validity of the signature of the respective transfer agent, and applying a wrapper to each validated information object including a current date-time stamp and a digital signature and authentication certificate of the trusted third-party repository of information objects, which handles at least one authoritative copy object based on rules established by an owner of the at least one authoritative copy object, comprising the steps of:

authenticating an identity of the owner;
  establishing at least one type of information object as an authoritative copy object that is not to be released by a trusted third-party repository of information objects;
  enabling at least one selected user to access at least one selected type of authoritative copy object;
  identifying at least one type of authoritative copy object required to conclude a deal;
  identifying and controlling at least one selected authoritative copy object as a transferable record;
  identifying at least one user able to authorize transfer of an interest in a transferable record; and
  validating the owner's right to act with respect to the deal.

36. The method of claim 35, wherein at least one type of authoritative copy object is established as potential transferable records.

* * * * *